United States Patent

Masaki et al.

[11] Patent Number: 5,414,339
[45] Date of Patent: May 9, 1995

[54] ELECTRIC VEHICLE CONTROL SYSTEM

[76] Inventors: Ryoso Masaki, 21-23, Ogitsu-cho 1-chome, Hitachi-shi, Ibaraki 319-14; Nobuyoshi Mutoh, 27-20, Nishiooshima 1-chome, Katsuta-shi, Ibaraki 312; Tsutomu Ohmae, 21-2, Motomiya-cho 4-chome, Hitachi-shi, Ibaraki 317; Toshiaki Okuyama, 1443-8, Suwama, Tokai-mura, Naka-gun, Ibaraki 319-11, all of Japan

[21] Appl. No.: 122,295

[22] Filed: Sep. 17, 1993

[30] Foreign Application Priority Data

Sep. 17, 1992 [JP] Japan ................ 4-247582

[51] Int. Cl.⁶ .......................................... H02P 7/00
[52] U.S. Cl. ...................... 318/800; 363/56; 318/139
[58] Field of Search .............. 318/434, 139, 798–812, 318/471–472, 432; 307/38, 32, 35, 45, 52, 58, 64, 66, 67, 82; 361/23, 25, 30, 33, 103; 363/37, 56, 170, 174; 110/2.1, 271

[56] References Cited

U.S. PATENT DOCUMENTS

| | | | |
|---|---|---|---|
| 3,889,127 | 6/1975 | Shibata | 318/139 X |
| 3,956,638 | 5/1976 | Ahrens et al. | 307/48 |
| 4,177,389 | 12/1979 | Schott | 307/86 X |
| 4,281,376 | 7/1981 | Munchow et al. | 307/87 |
| 4,335,337 | 6/1982 | Okamatsu et al. | 318/52 |
| 4,426,611 | 1/1984 | Espelage et al. | |
| 4,455,522 | 6/1984 | Lipo | |
| 4,558,230 | 12/1985 | Western | 307/66 |
| 4,706,177 | 11/1987 | Josephson | 363/56 |
| 5,003,453 | 3/1991 | Tighe et al. | 307/66 X |
| 5,262,935 | 11/1993 | Shirahama et al. | 363/37 X |

FOREIGN PATENT DOCUMENTS

| | | |
|---|---|---|
| 0279415 | 8/1988 | European Pat. Off. . |
| 56-029467 | 5/1981 | Japan . |
| 56-088676 | 10/1981 | Japan . |
| 60-102878 | 10/1985 | Japan . |
| 61-150698 | 10/1986 | Japan . |
| 63-23589 | 1/1988 | Japan . |
| 63-305792 | 12/1988 | Japan . |
| 2-133005 | 5/1990 | Japan . |
| 02-133005 | 8/1990 | Japan . |
| 02311124 | 3/1991 | Japan . |
| 3-251002 | 11/1991 | Japan . |
| 03251002 | 2/1992 | Japan . |

Primary Examiner—Jonathan Wysocki

[57] ABSTRACT

An electric vehicle control system for driving a battery powered motor with use of power inverters. First and second inverters are connected with the respective three-phase primary windings of an induction motor. If one of the inverters fails, failure detection circuits detect it, and a control unit stops the failed inverter and allows the other normal inverter to drive the induction motor to move the electric vehicle. Driving the single motor with a plurality of power inverters allows the electric vehicle to move and run even if one of the power inverters fails.

34 Claims, 19 Drawing Sheets

ELECTRIC VEHICLE CONTROL SYSTEM

BACKGROUND OF THE INVENTION

The present invention relates to battery driven electric vehicle control system. More particularly, this invention provides a highly reliable electric vehicle control system driven by a simple arrangement.

Battery driven electric vehicle control systems have been described in the past, including the methods in the Japanese Laid-Open Patents 3-251002 and 2-133005. The former method in the Japanese Laid-Open Patent 3-251002 uses a simple drive system to drive a vehicle in which a single inverter controls a single motor. The latter method in the japanese Laid-Open Patent 2-133005 provides an optimized drive force for each of a plurality of motors to make the vehicle operate highly efficiently, thereby increasing its running distance per charge.

Methods for driving an ac motor with a plurality of power converters are also known, including, for example, the methods disclosed in the Japanese Laid-Open Patents 63-323589, 63-305792. These methods for driving a plurality of windings of an ac motor, with respective power converters, are suitable for high capacity.

Each of these prior art devices, however, suffers from at least one particular disadvantage. In the first prior art control mentioned above, if there is a failure in the power converter for driving the motor, the motor cannot be driven, and hence the vehicle cannot be run.

The second prior art device can drive the vehicle even if one power converter fails, as it has the same number of power converters as it has motors. However, the requirement for multiple motors complicates the drive system for the electric vehicle.

The third and fourth prior art devices provide a plurality of power converters. However, these patent documents do not consider which one or how many power converters are used for driving.

In view of the foregoing, a first object of the present invention is to provide a simple electric vehicle control system, for optimal control of a plurality of power converters, depending on the drive state of the electric vehicle.

A second object of the present invention is to provide an electric vehicle that can run safely, even if any one of the power converters fails.

A third object of the present invention is to provide an electric vehicle control which is efficient and highly reliable, with a longer service life.

SUMMARY OF THE INVENTION

Briefly, the foregoing objects are accomplished by the electric vehicle control system according to the invention, which has a motor for driving a vehicle, a battery for storing drive energy for the vehicle, a plurality of power converters for converting a voltage of the battery to supply power to the motor, and a control unit for controlling the plurality of power converters. According to the invention, the motor is driven by at least one of the plurality of power converters, and the control unit controls the operating state of the power converters based on the drive state of the vehicle. If a failure is detected in one or more (but not all) of the power converters, only the power converters other than the failed one(s) are used to drive the motor, and the control apparatus controls a maximum speed of the vehicle or a maximum torque thereof.

In another embodiment of the invention, the number of driving power converters is varied based on an output torque of the motor or a speed thereof.

The control unit outputs a torque command based on an accelerator pedal position and a brake pedal position of the vehicle. For the torque command, the control unit determines a power command for output from each of the power converters. The power command controls each power converter, which in turn supplies necessary power to the motor. In the ordinary condition, the control unit determines the optimum number of the power converters to be driven (depending on the output torque command and the motor speed), and activates the necessary number of the power converters, stopping the other power converter(s). This arrangement always allows driving at a high efficiency within an optimum capacity range of the power converter, without decreasing the efficiency of the power converter, even if the output torque command and the motor speed are lowered. That is, the vehicle's running distance per charge can be increased.

If the control unit determines that one or more (but not all) of the power converters has failed, the control unit turns off the failed power converter(s); thus, stopping the power supply to that converter, and allowing only the other normal power converters to supply power to the motor to generate the rotating field. The rotating field can thus drive the motor to run the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
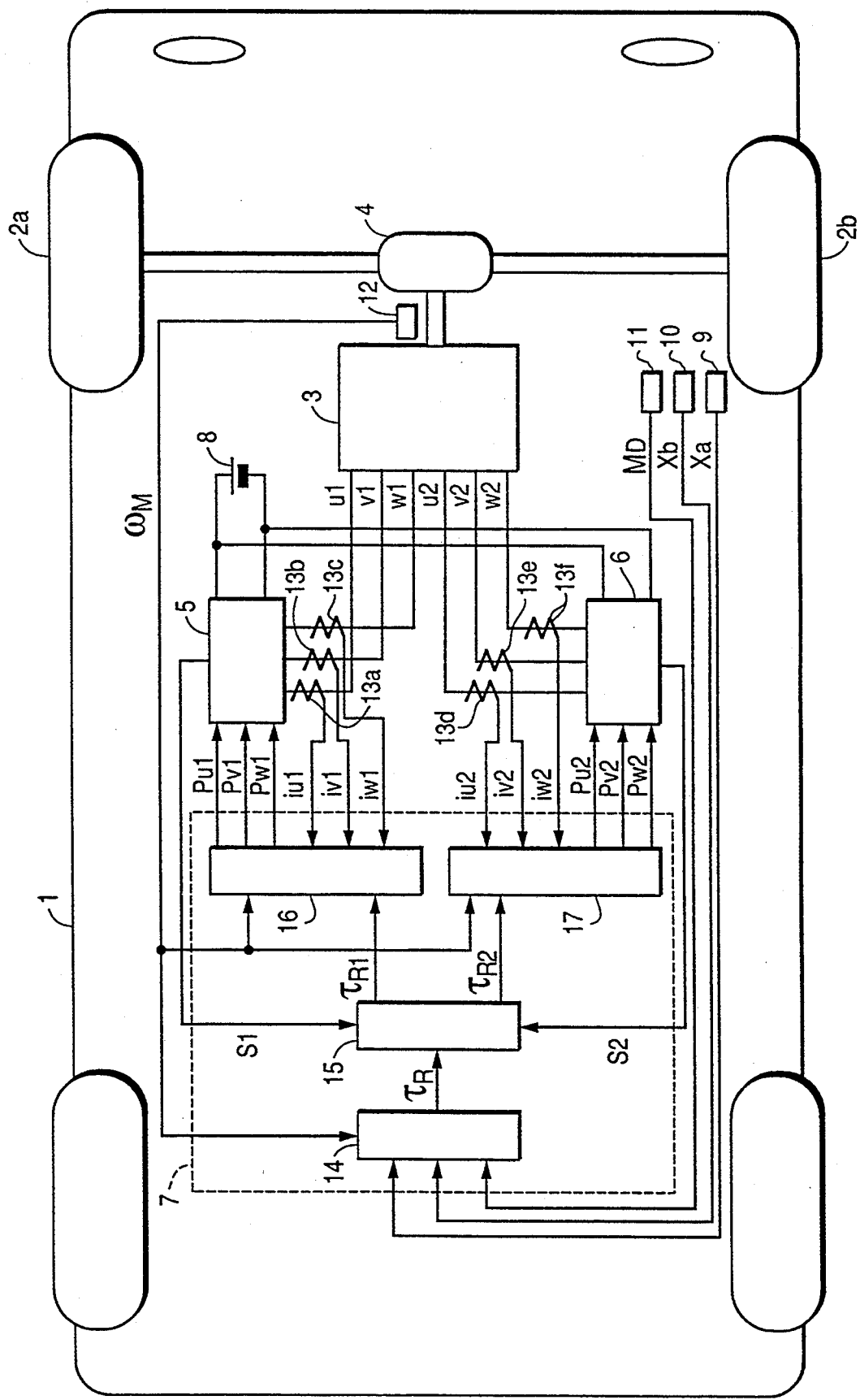
FIG. 1 is a schematic diagram of an embodiment of the present invention in which an induction motor having two three-phase windings drives an electric vehicle.

Referring now to FIG. 1 there is shown a schematic diagram for an embodiment of the invention in which an induction motor 3 having two three-phase windings drives front wheels 2a and 2b of an electric vehicle 1. The front wheels 2a and 2b are connected with the induction motor 3 through the differential gears 4.

Each of the two three-phase windings of the induction motor 3 (described later) is connected through respective first and second DC-AC inverters 5 and 6. The first and second inverters 5 and 6 are controlled in a manner that is known, per se, by pulse width modulated pulses $P_{U1'}$, $P_{V1}$, and $P_{W1}$ and $P_{U2}$, $P_{V2}$, and $P_{W2}$ respectively, from a control unit 7, to convert d.c. power from battery 8 to a.c. before it is supplied to the induction motor 3. The control unit 7, which may be in the form of a microprocessor, for example, receives an accelerator pedal position signal $X_a$ and a brake pedal position signal $X_b$ from acceleration pedal 9 and brake pedal 10, which are manipulated by a driver. In addition, the control unit 7 also receives a mode signal $M_D$, a motor speed $\omega_M$, currents $i_{U1}$, $i_{V1}$, and $i_{W1}$ from the first inverter 5 and currents $i_{V2}$, $i_{V2}$, and $i_{W2}$ from the second inverter 6. When the control unit 7 is a conventional microprocessor, the sensor output signals $X_a$ and $X_b$, $M_D$, $\omega_M$ and currents $i_{U1}$–$i_{W2}$ are first digitized in any conventional manner. Alternatively, the control unit 7 may also be implemented in the form of analog components in a manner which will be readily understood by those skilled in the art of vector control of induction motors, such as discussed in U.S. Pat. Nos. 4,455,522 and 4,862,343.

The mode signal is provided from a drive mode lever 11 manipulated by the driver to direct the electric vehicle 1 forward, backward, or parking, while the motor speed $\omega_M$ is detected by a motor speed detector 12. The output currents $i_{U1}$, $i_{V1}$, and $i_{W1}$ of the first inverter 5 and the output currents $i_{U2}$, $i_{V2}$, and $i_{W2}$ of the second inverter 6 are detected by respective current detectors 13a, 13b, 13c, 13d, 13e, and 13f. The first and second inverters also output inverter failure signals $S_1$ and $S_2$ to the control unit 7.

The control unit 7 comprises a torque command generation section 14, a torque distribution process section 15, a first torque control section 16, and a second torque control section 17. The torque command generation section 14 outputs a motor torque command $\tau_R$ based on the accelerator pedal position $X_a$ and the brake pedal position $X_b$, the mode signal $M_D$, and the motor speed $\omega_M$.

Figure 2:
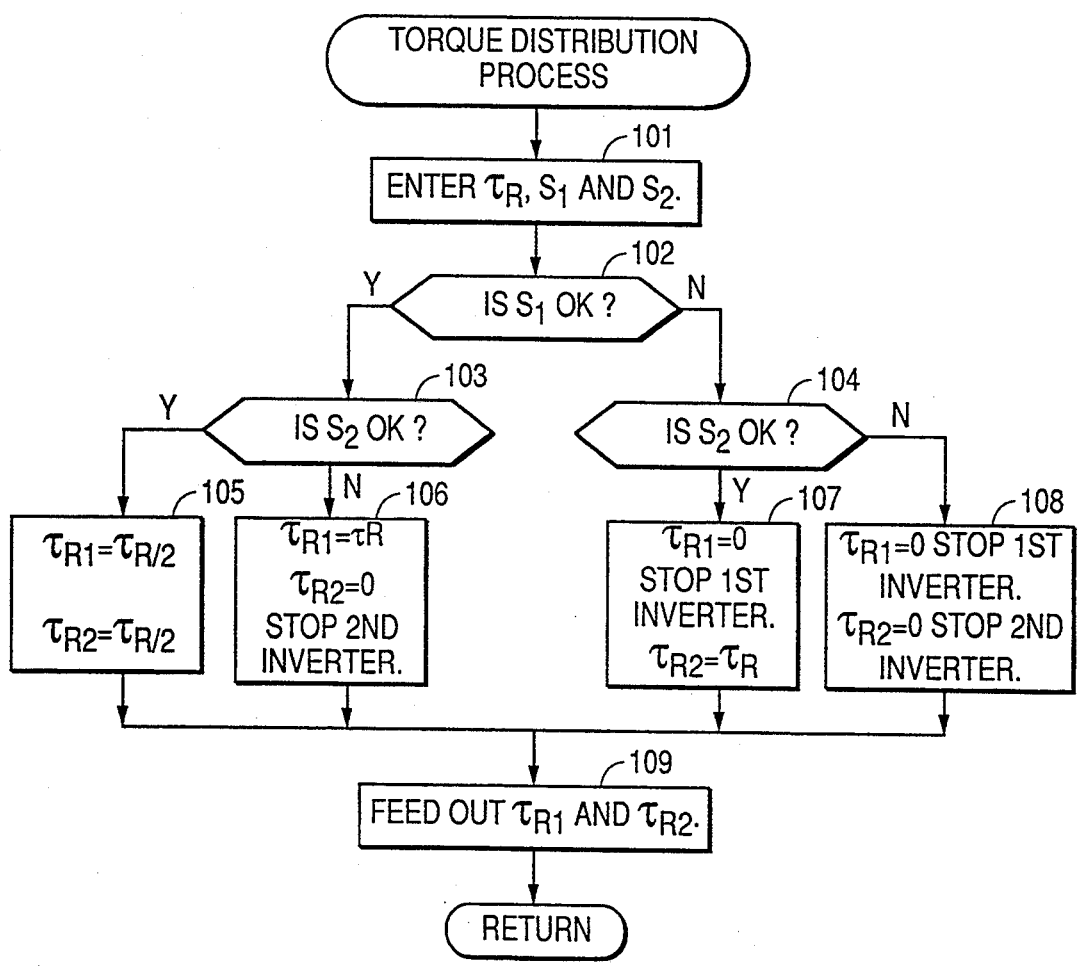
FIG. 2 is a flow chart for the process performed by the torque distribution section in FIG. 1.

The operation of the torque distribution process section 15 is shown in the flow chart of FIG. 2. First, the motor torque command $\tau_R$ and the inverter failure signals $S_1$ and $S_2$ are entered in step 101. (The inverter failure signals $S_1$ and $S_2$ are fed out during a failure of the inverters, and continue until the inverters are recovered from the failures.) In step 102, a determination is made based on the inverter failure signal $S_1$ whether the inverter 5 is normal or has failed, and in steps 103 or 104 the same determination is made for inverter 6, based on signal $S_2$. If the inverters are all normal, processing goes to step 105, and the total torque called for by the torque command $\tau_R$ is divided equally between the two torque commands $\tau_{R1}$ and $\tau_{R2}$ for the first and second inverters respectively. That is, $\tau_{R1}$ and $\tau_{R2}$ are set equal to each other, at a level such that their total equals $\tau_R$. If only the second inverter 6 is judged to have failed from the inverter failure signal $S_2$, processing goes to step 106, the first torque command $\tau_{R1}$ is set to the value of the motor torque command $\tau_R$ and the second torque command $\tau_{R2}$ is set to 0 to stop the second inverter 6. If only the first inverter 5 is judged to have failed from the inverter failure signal $S_1$, on the other hand, step 107 sets the first torque command $\tau_{R1}$ to 0 and the second torque command to $\tau_{R2}$ to the value of the motor torque command $\tau_R$ to stop the first inverter 5. If both of the inverters are determined to have failed, the first and second torque commands $\tau_{R1}$ and $\tau_{R2}$ are both set to 0 to stop the two inverters. Thus, the failure of one inverter, (step 108) which would otherwise adversely affect the motion of the electric vehicle, can be instantaneously compensated by turning off the failed inverter, since the other inverter can generate the necessary torque. In this manner, the electric vehicle can be kept safe, without sudden acceleration or sudden deceleration, even upon failure of any inverter.

The first and second torque commands $\tau_{R1}$ and $\tau_{R2}$ obtained above are entered to the first torque control section 16 and the second torque control section 17, respectively. The first torque control section 16 performs vector control calculation using the first torque command $\tau_{R1}$ and the motor speed $\omega_M$ to generate current command $i_{U1R}$, $i_{V1R}$, $i_{W1R}$, for the respective phases U, V, and W for the first inventor. The current Command it* shown in U.S. Pat. No. 4,862,343, is proportional to the torque command, and accordingly, the current commands $i_{U1R}$, $i_{V1R}$, $i_{W1R}$, can be obtained in the same manner as described therein.

The currents $i_{U1}$, $i_{V1}$, $i_{W1}$, for the respective phases U, V and W of the invertor 5 are fed back into the first torque control section 16, and the current commands for respective phases, $i_{U1R}$, $i_{V1R}$, $i_{W1R}$, are compared with each of the currents, $i_{U1}$, $i_{V1}$, $i_{W1}$, for each corresponding phase to generate current deviations for each phase, $\Delta i_{U1}$, $\Delta i_{V1}$, $\Delta i_{W1}$. Using the above described current deviations, $\Delta i_{U1}$, $\Delta i_{V1}$, $\Delta i_{W1}$ as input data, proportional calculation or proportional integration is performed to obtain voltage commands for respective phase.

A calculation for generating PWM signals so that average voltages for each phase in the invertor 5 coincide with the voltage commands for each phase is performed in the manner described in the prior art, U.S. Pat. No. 4,862,343, and PWM pulses $P_{U1}$, $P_{V1}$, and $P_{W1}$, are entered to the first invertor 5. The operation of the second torque control section 17 and the inverter 6 are exactly analogous.

Figure 3:
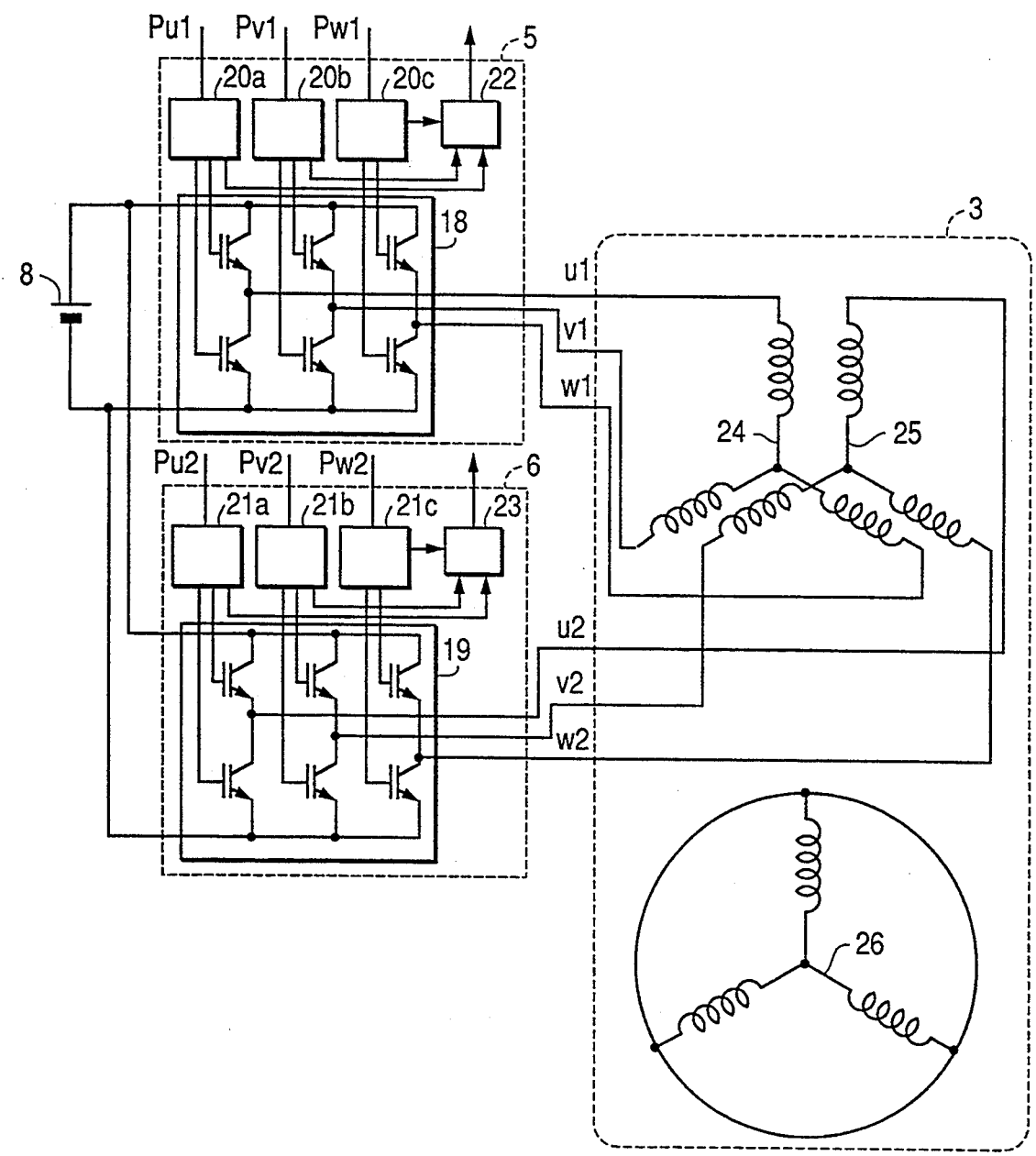
FIG. 3 is a circuit diagram illustrating the connection of the two three-phase windings of the induction motor with two inverters in FIG. 1.

FIG. 3 shows the connection of the first and second inverters 5 and 6 with the induction motor 3. The first inverter 5 includes a three-phase inverter main circuit 18 having six power devices, pulse distribution circuits 20a, 20b, and 20c, and a failure detector circuit 22. Similarly, the second inverter 6 is made up of a three-phase inverter main circuit 19 having six power devices, pulse distribution circuits 21a, 21b, and 21c, and a failure detector circuit 23. The induction motor 3 is made up of two three-phase primary (stator) windings 24 and 25, and a secondary (rotor) winding 26. The first inverter 5 operates as follows. The PWM pulses $P_{U1}$, $P_{V1}$, and $P_{W1}$ from the control unit 7 are entered to the respective pulse distribution circuits 20a, 20b, and 20c (which may be, for, for example bistable multivibrators, or "flip-flops), which activate the two power devices of each phase to feed out two PWM pulses in non-lapping intervals. The three-phase inverter main circuit 18, thus converts the voltage of the battery 8 to three-phase ac voltage, which is applied to the three-phase winding 24 of the induction motor 3.

It is essential that either the first inverter 5 or the second inverter 6, operating alone, can induce a rotating field in the secondary winding 26 of the induction motor 3. Thus, the rotor of the induction motor 3 can be driven by controlling either of the inverters 5 and 6.

The following describes the operation of FIG. 3 if any one of the power devices of the three-phase inverter main circuit 18 fails. The pulse distribution circuits 20a, 20b, and 20c for distributing the pulses to the power devices in the inverter main circuit 18 can detect such failure by comparing the voltage across the power devices (transistors) of inverter main circuit 18 with predetermined reference voltages. When any of such voltages exceeds the reference value, the associated pulse distribution circuit provides a power device failure signal to the failure detection circuit 22, which in turn outputs the inverter failure signal $S_1$ to the control unit 7 causing the first inverter 5 to stop supplying power to the three-phase winding 24. Since the second inverter 6 is normal, however, power continues to be supplied to the primary winding 25, which can generate the rotating field. Thus, even if the first inverter 5 cannot be operated, the induction motor 3 can still be driven, thereby enabling the electric vehicle 1 to continue to operate. Similarly, if the second inverter 6 fails the first inverter 5 alone can keep the electric vehicle 1 running.

The electric vehicle control system in the above embodiment of the present invention has the advantage that it can be used in an electric vehicle having only one motor. The embodiment, therefore, can provide a low-cost electric vehicle that can be run safely even if one inverter fails. Since the one failed inverter (which might otherwise adversely affect the motion of the electric vehicle) can be turned off instantaneously, the electric vehicle can keep running safely without sudden acceleration or sudden deceleration, despite the inverter failure.

Figure 4:
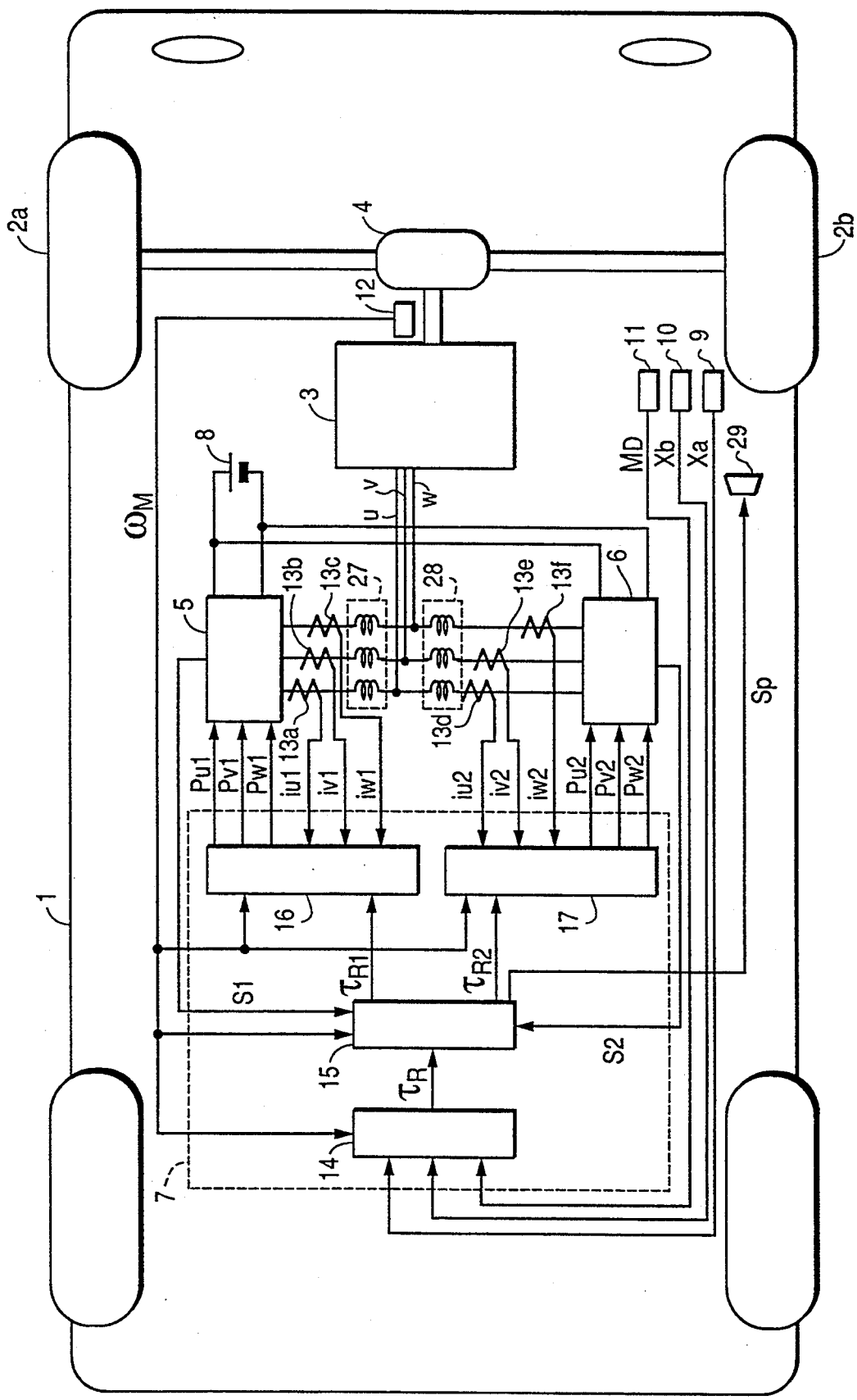
FIG. 4 is a schematic diagram for another embodiment of the present invention in which the induction motor has a single three-phase winding to drive the electric vehicle.

FIG. 4 is a schematic diagram for another embodiment of the present invention in which the induction motor 3 has a single three-phase winding. The following describes only the parts in FIG. 4 which differ from those in FIG. 1. The induction motor 3 is an ordinary type having one three-phase primary winding, and the outputs of the first and second inverters 5 and 6 are connected via reactors 27 and 28. The output terminals of the reactors 27 and 28 are connected with the respective phase terminals of the induction motor 3. Connected in this manner, the reactors 27 and 28 suppress the currents so that either of the inverters can drive the induction motor 3, without flowing of a short-circuit current through the first inverter 5 and the second inverter 6. The motor therefore can be driven even if one inverter fails. Accordingly, the system in FIG. 4 can be accomplished at a lower cost by using a conventional general-purpose motor.

Figure 5:
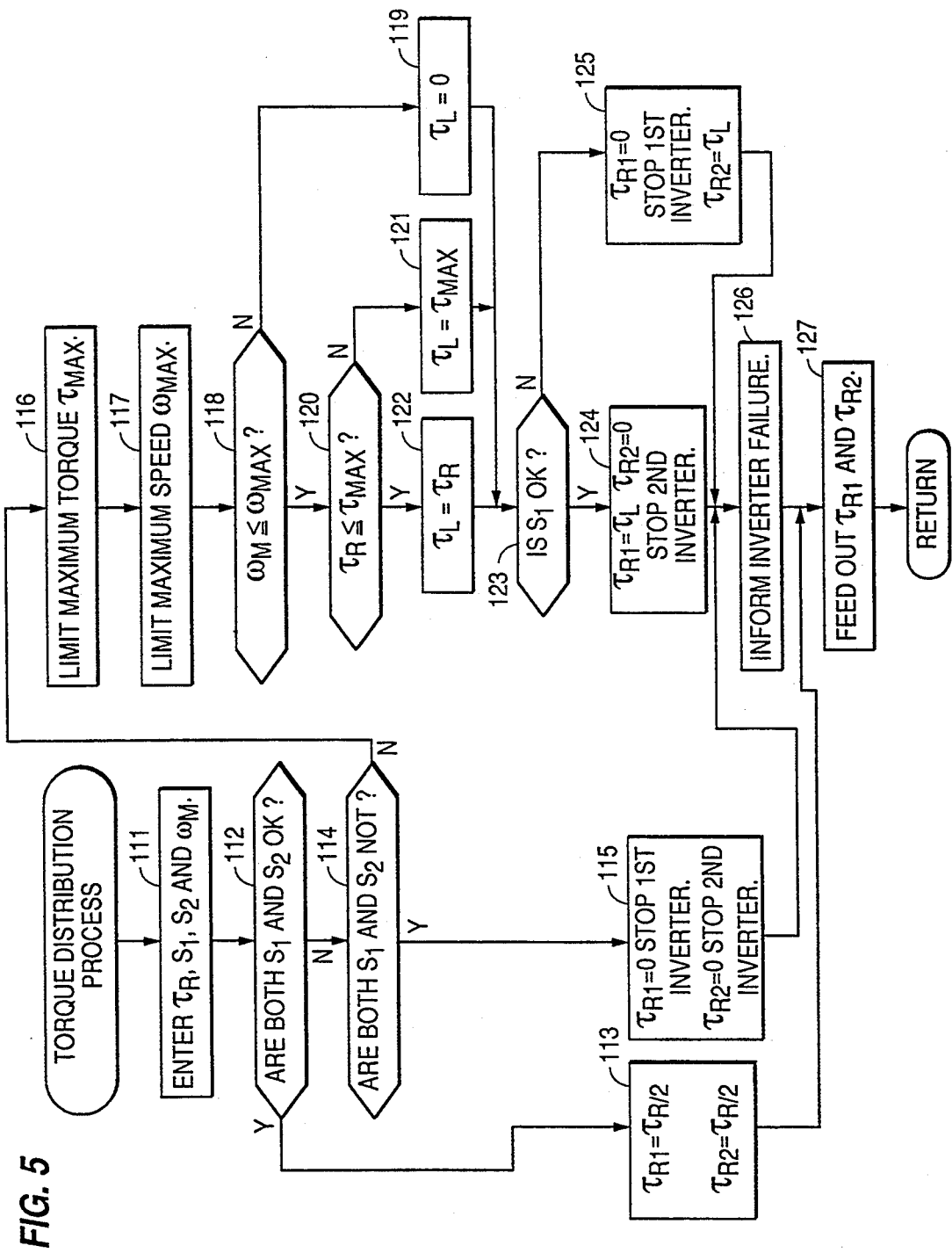
FIG. 5 is a flow chart for the process performed by the torque distribution section in FIG. 4.

The control unit 7 in FIG. 4 differs from the one in FIG. 1 in that the torque distribution process section 15 receives the motor speed $\omega_M$ as an additional input, and outputs an indication signal $S_P$. The operation of the torque distribution process section 15 of FIG. 4 is shown in FIG. 5. First, in step 111 the motor torque command $\tau_R$, the inverter failure signals $S_1$ and $S_2$, and the motor speed $\omega_M$ are entered. In step 112, a determination is made whether the inverter failure signals $S_1$ and $S_2$ are normal or indicate failure. If all are normal, step 113 sets the first and second torque commands $\tau_{R1}$ and $\tau_{R2}$ as equal halves of the motor torque command $\tau_R$, respectively. If there is a failure, step 114 checks whether the two inverters are both failed, and if so, step 115 sets both the first and second torque commands $\tau_{R1}$ and $\tau_{R2}$ to 0 to stop the two inverters. These processes thus far are similar to those in FIG. 2. If only one of the two inverters has failed, additional processing steps 116 to 125 are performed as follows. Steps 116 and 117 provide limits on the maximum torque $\tau_{MAX}$ and the maximum speed $\omega_{MAX}$ of the induction motor 3, which limits are lower than the ordinary rated values. Next step 118 compares the current motor speed $\omega_M$ with the maximum speed $\omega_{MAX}$; if the current motor speed $\omega_M$ is greater than the maximum speed $\omega_{MAX}$ processing goes to step 119, in which a torque limit value $\tau_L$ is set to 0, so that the motor cannot generate torque until the motor speed $\omega_M$ is slowed down to a safe stopping speed. (Alternatively $\tau_L$ can be set to a negative figure, equivalent to engine braking.) If the motor speed $\omega_M$ is lower than the maximum speed $\omega_{MAX}$, the motor can be stopped easily and safely at any time. Step 120 then compares the motor torque command $\tau_R$ generated by the torque command generation section 14 with the maximum torque $\tau_{MAX}$. If $\tau_R$ exceeds $\tau_{MAX}$, in step 121 the torque limit value $\tau_L$ is set equal to the maximum torque $\tau_{MAX}$, thus limiting the torque available from the induction motor 3 if any one of the inverters fails. If the motor torque command $\tau_R$ is lower than the maximum torque $\tau_{MAX}$, step 122 sets the torque limit value $\tau_L$ to the motor torque command $\tau_R$.

Step 123 examines the inverter failure signal $S_1$ to determine which inverter has failed. That is, if the inverter failure signal $S_1$ is normal, then only the second inverter 6 has failed, and step 124 then sets the first torque command $\tau_{R1}$ to the torque limit value $\tau_L$ and the second torque command $\tau_{R2}$ to 0, thereby stopping the second inverter 6. If the inverter failure signal $S_1$ indicates a failure of the first inverter 5 at step 123, step 125 sets the first torque command $\tau_{R1}$ to 0 and the second torque command $\tau_{R2}$ to the torque limit value $\tau_L$, stopping the first inverter 5. The next step 126 outputs a signal $S_P$, which is sent from the torque distribution process section 15 to a signaling unit 29, which alerts the driver to the inverter failure by means of an audible or visible alarm signal. The driver will then know that the maximum speed of the electric vehicle 1 and the maximum torque thereof are limited, so that safe driving can be maintained.

The embodiment described above (as set forth in FIG. 5) thus provides the additional safety feature that the maximum speed and the maximum torque of the electric vehicle can be automatically limited, and a signal provided to the driver, if there is an inverter failure.

Figure 6:
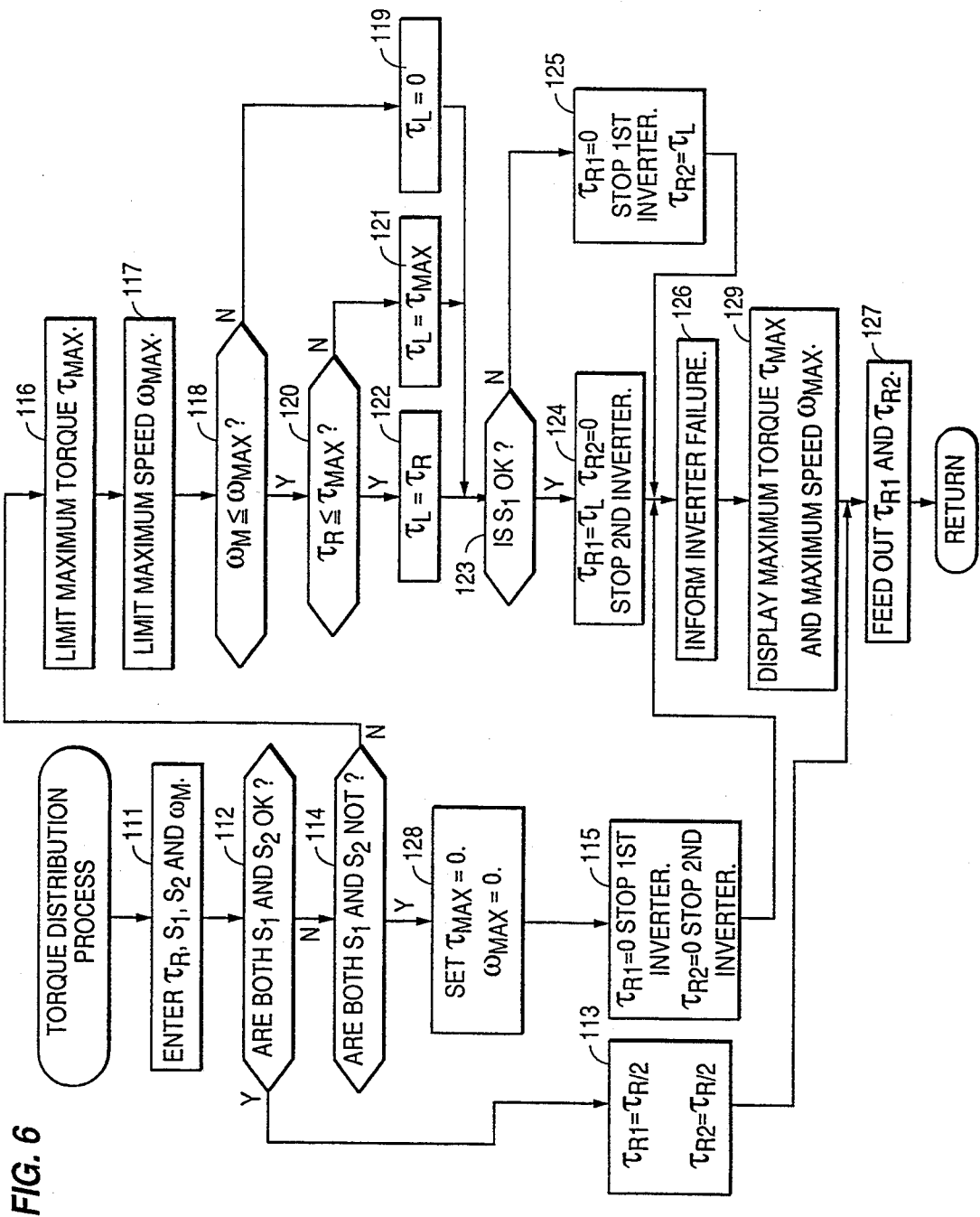
FIG. 6 is a flow chart which shows another embodiment of the process performed by the torque distribution section in FIG. 4.

FIG. 6 shows another embodiment of the present invention which differs from one in FIG. 5 by the addition of steps 128 and 129. Step 128 sets both the maximum torque $\tau_{MAX}$ and the maximum speed $\omega_{MAX}$ to 0 if both the inverter failure signals $S_1$ and $S_2$ indicate failure. If either of the inverter failure signals $S_1$ or $S_2$ fails, step 129 signals the inverter failure to the driver and displays the maximum torque $\tau_{MAX}$ and the maximum speed $\omega_{MAX}$ of the electric vehicle with the indication signal SP. With this feature, the driver can also know whether the electric vehicle can be driven or not, as well as the distance that it can run. The driver then can take proper corrective action to respond the inverter failure. In other words, this embodiment has the advantage that it can help the driver to take appropriate action at the time of inverter failure, thereby further increasing the safety of the electric vehicle.

Figure 7:
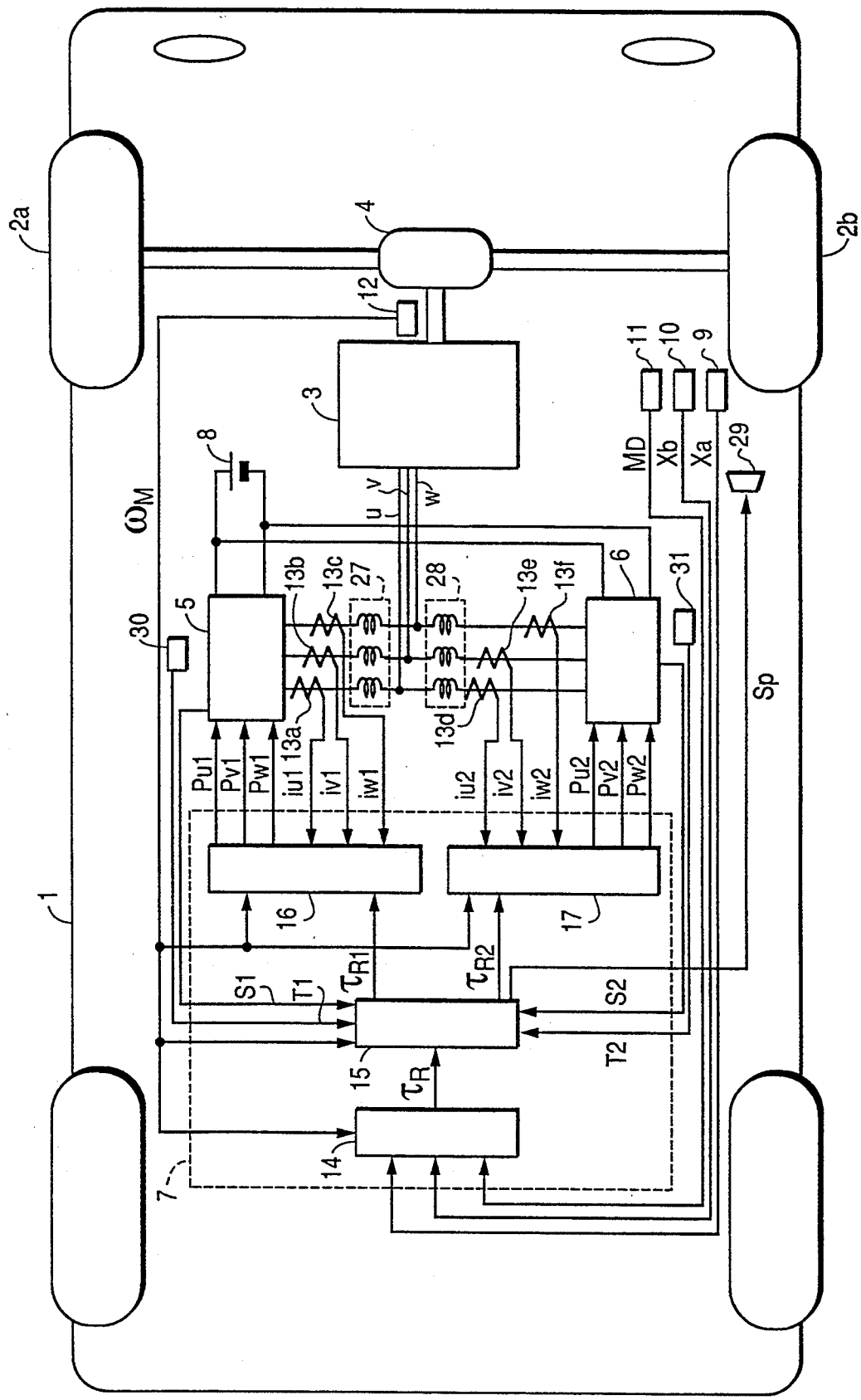
FIG. 7 is a schematic diagram for still another embodiment of the present invention having temperature sensors for detecting the inverter temperatures.

FIG. 7 is a schematic diagram for still another embodiment of the present invention having, in addition to the elements included in FIG. 4, first and second temperature sensors 30 and 31, which can detect temperatures $T_1$ and $T_2$ of the first and second inverters 5 and 6, respectively. The detected temperatures are fed to the torque distribution process section 15 of the control unit 7.

Figure 8:
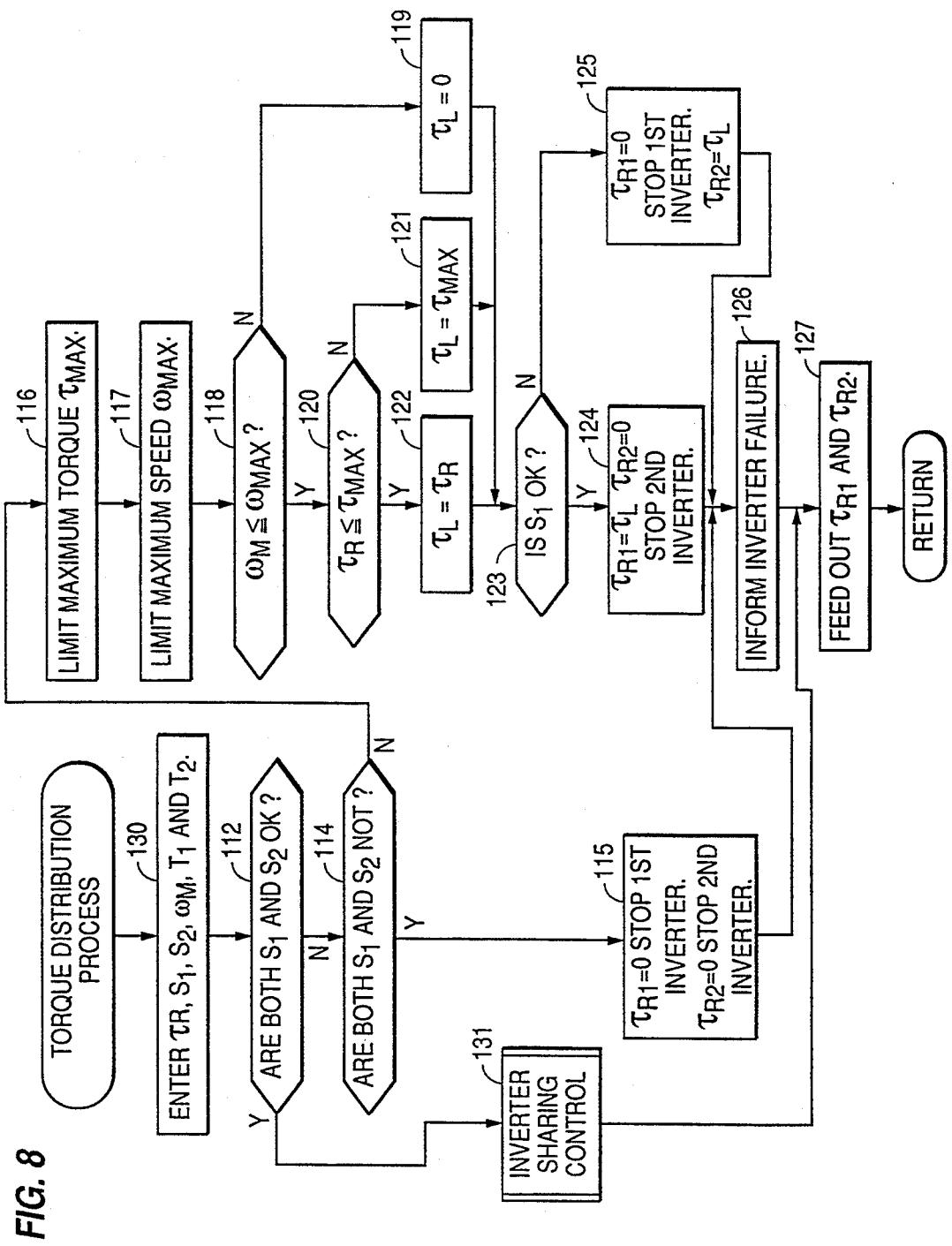
FIG. 8 is a flow chart showing the process performed by the torque distribution process section, using the temperature sensors in FIG. 7.

FIG. 8 is a flow chart which shows the processing performed by the torque distribution process section 15 in this embodiment. It differs from the one in FIG. 5 in two respects: First, in step 130 the temperature $T_1$ and $T_2$ of the first and second inverters 5 and 6 are entered; and second if the first and second inverters 5 and 6 are both normal, step 131 is performed in place of step 113, as shown in more detail in FIG. 9.

Figure 9:
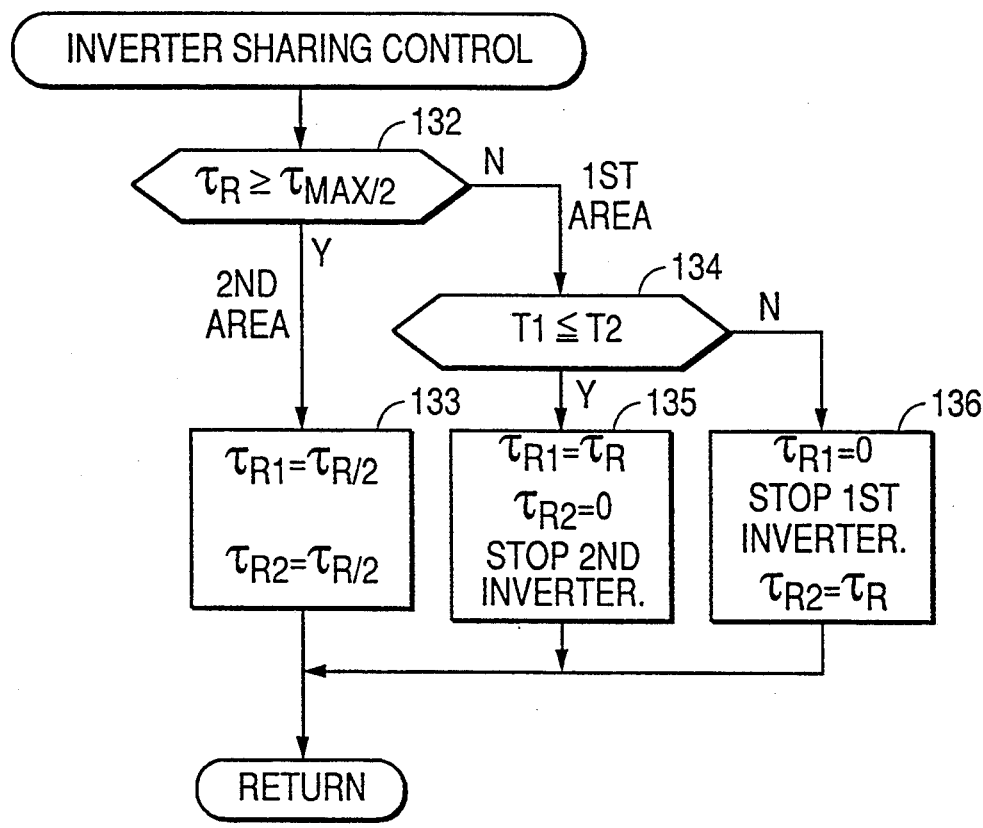
FIG. 9 is a flow chart for the process performed by the inverter sharing control in FIG. 8.
Figure 10:
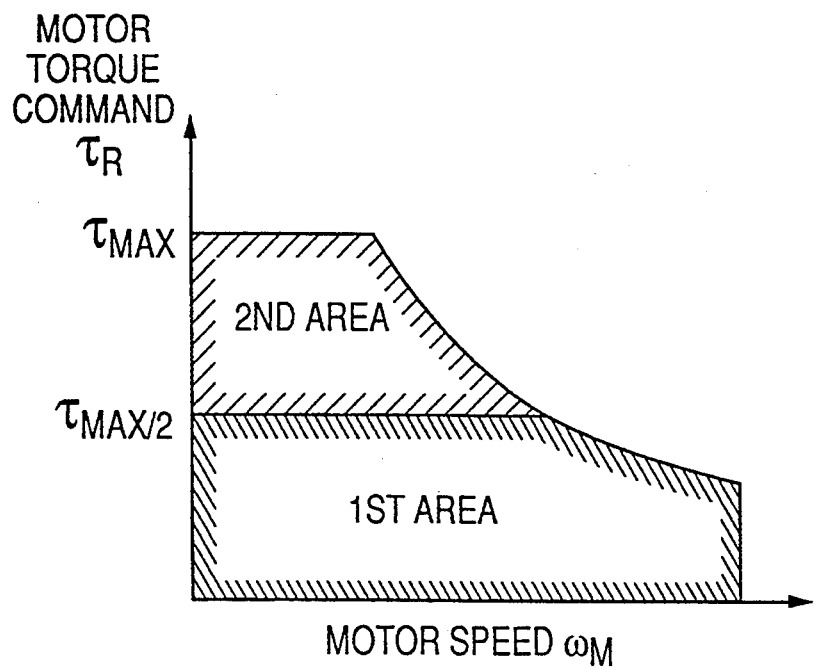
FIG. 10 is a characteristic graph for two divided areas of the motor torque available with respect to the motor speed in FIG. 9.

In FIG. 9, a determination is first made at step 132 whether the motor torque command $\tau_R$ is more than half of the maximum torque $\tau_{MAX}$. FIG. 10 is a characteristic graph of available motor torque versus motor speed, which shows the area in which the motor torque command $\tau_R$ is less than half of the maximum torque $\tau_{MAX}$, called the first area, and where the motor torque command $\tau_R$ is more than half of the maximum torque $\tau_{MAX}$, called the second area here. If it is determined in step 132 that the motor toque command $\tau_{R2}$ is greater than half of the maximum torque $\tau_{MAX}$, step 133 sets each of the first torque command $\tau_{R1}$ and the second torque command $\tau_{R2}$ to half of the torque signal $\tau R$ in the same manner as in FIG. 5. However, if the motor torque command $\tau_R$ is lower than half of the maximum torque $\tau_{MAX}$ (or in other words, is in the first area), step 134 compares the temperature $T_1$ of the first inverter 5 with the temperature $T_2$ of the second inverter 6. If $T_1$ is lower than $T_2$, then step 135 sets the first torque command $\tau_{R1}$ the value of the motor torque command $\tau_R$ and the second torque command $\tau_{R2}$ to 0 to stop the second inverter 6. If $T_1$ is greater than $T_2$, then step 136 sets the first torque command $\tau_{R1}$ to 0 and the second torque command $\tau_{R2}$ to the motor torque command $\tau_R$ to stop the first inverter 5.

With the method described in this embodiment, when both inverters are operating normally, the number of the inverters can be reduced from two to one, and the inverter loss at the time of low torque driving can be reduced compared with that of rated torque driving. That is, when one inverter is stopped, overall total inverter loss is reduced, thereby increasing the efficiency. Because the inverter selected to be stopped is the one of higher inverter temperature, the inverter service life can be prolonged, thus further increasing the reliability of the electric vehicle. Since selection of the inverter with the higher temperature would result in a higher inverter loss, use of lower inverter loss leads to an increase of efficiency. The arrangement in FIG. 7 also permits a reduction by one-half in the current capacity of the inverters.

Figure 11:
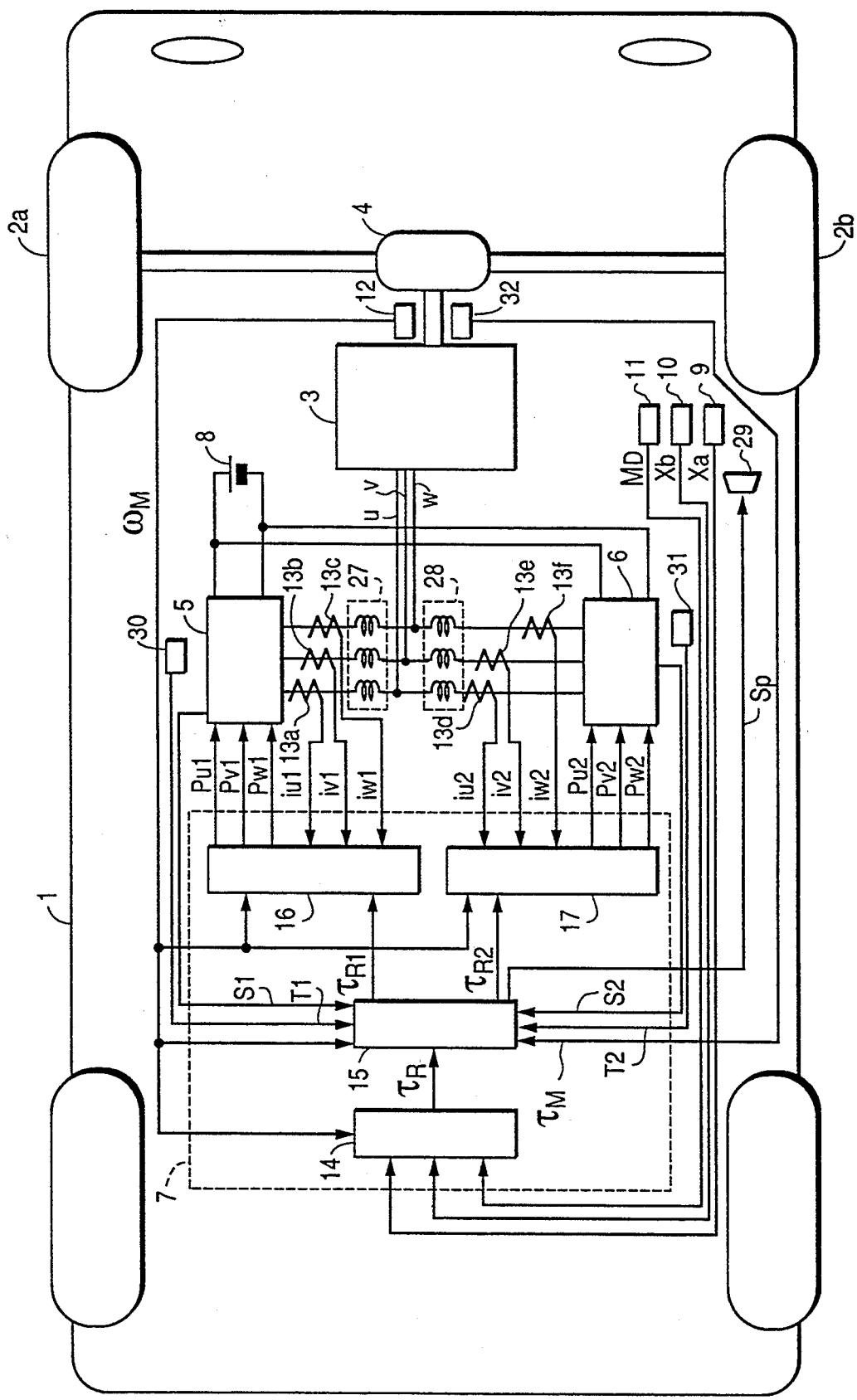
FIG. 11 is a schematic diagram for still another embodiment of the present invention having a torque detector.
Figure 12:
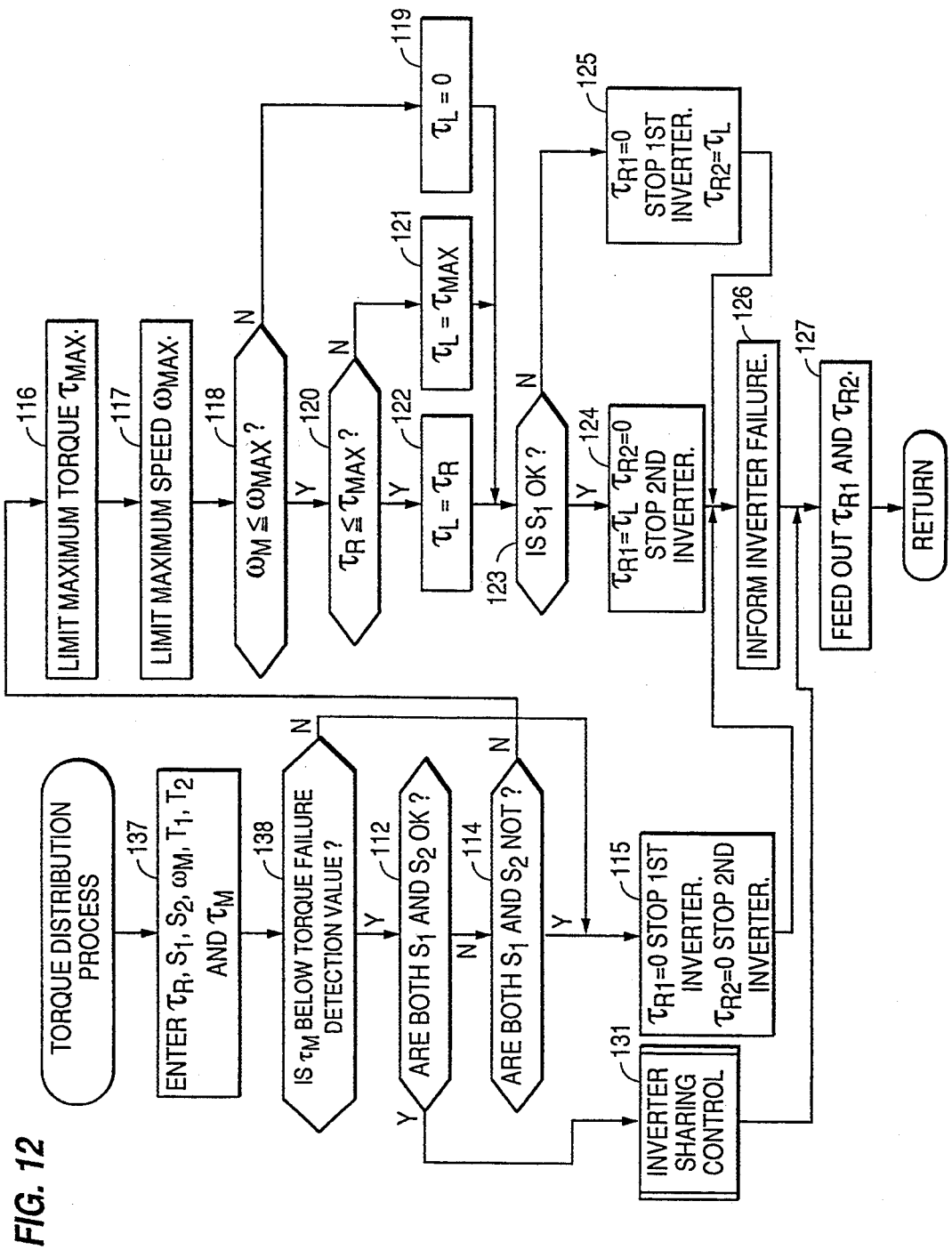
FIG. 12 is a flow chart for the process performed by the torque distribution process section using a torque detector in FIG. 11.

FIG. 11 is still another embodiment of the present invention having in addition to the apparatus of FIG. 7, a torque detector 32 which detects the output torque $\tau_M$ of the induction motor 3 and provides a corresponding signal to the torque distribution process section 15. The operation of the torque distribution process section 15 in this embodiment is shown in FIG. 12. It differs from the embodiment in FIG. 8 by the addition of steps 137 and 138. Step 137, which replaces step 130 in FIG. 8, has an additional motor torque $\tau_M$ input. Step 138, which is added to the process, compares the motor torque $\tau_M$ with a predetermined torque failure detection value, which represents a maximum permissible torque output based on the rated capacity of the motor. If the motor torque $\tau_M$ is less than the torque failure detection value, step 112 and the following steps are processed as in FIG. 8. If, however, the motor torque $\tau_M$ equals or exceeds the torque failure detection value, processing goes to step 115 to stop the first and second inverters. The torque failure detection value is set at a level that will not adversely affect the operation of the electric vehicle 1 for a short time until the inverter stops. In general, if an inverter has failed, the inverter failure signal $S_1$ or $S_2$ stops the inverter so that the motor torque $\tau_M$ will not be affected adversely. However, with the arrangement of FIG. 12, even if the inverter failure signal $S_1$ or $S_2$ is undetected, the motor torque $\tau$ can be limited.

This embodiment has the advantage that a torque cannot be generated to suddenly accelerate or decelerate the electric vehicle 1 even if any of the inverter failure signals $S_1$ and $S_2$ fails, so that safety is further increased. Also, since the method provides double protection against a driving failure, the reliability of the system is further increased.

Figure 13:
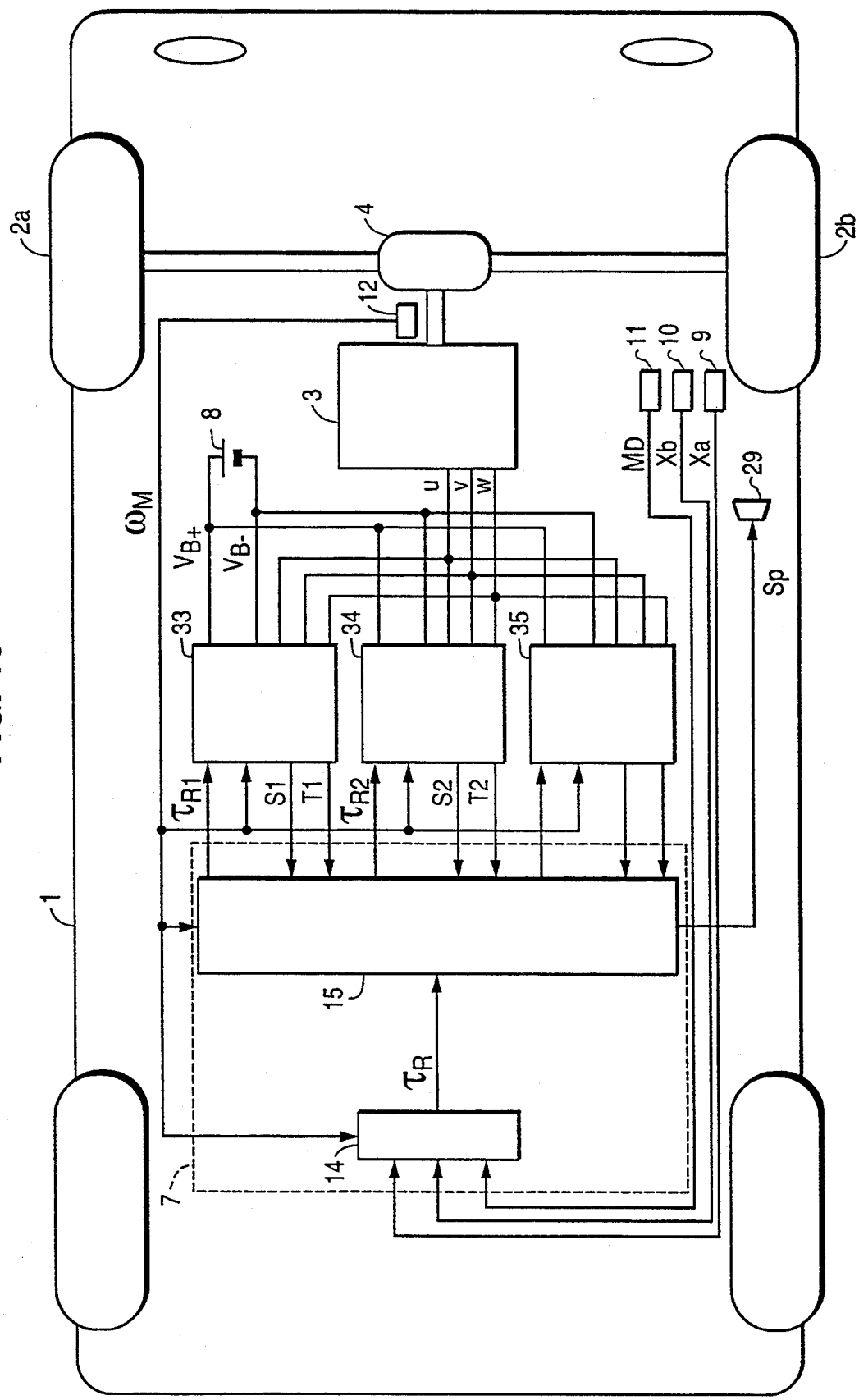
FIG. 13 is a schematic diagram of still another embodiment of the present invention having three inverter units used therein.
Figure 14:
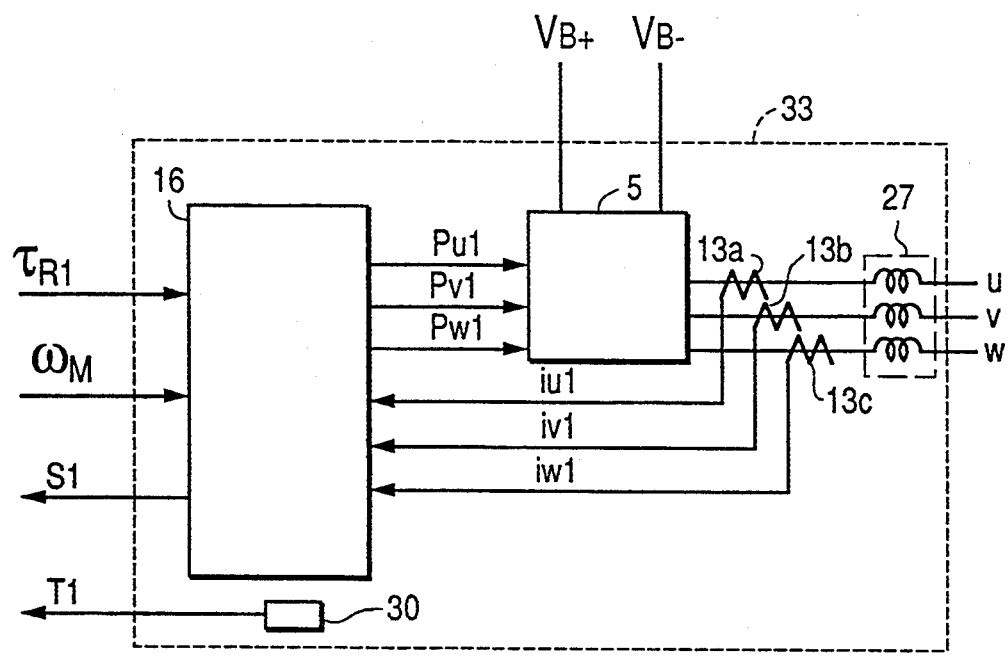
FIG. 14 is a circuit diagram for the inverter unit in FIG. 13.

FIG. 13 is a schematic diagram for still another embodiment of the present invention having three inverter units 33, 34 and 35 rather than two, as in the previous embodiments. In this embodiment, the control unit 7 comprises the torque command generation section 14 and the torque distribution process section 15 only, the torque control sections having been included in the inverter units 33, 34 and 35. As shown in FIG. 14, the inverter unit 33 (which is representative of the other two) is made up of a first torque control section 16, a first inverter 5, current detectors 13a, 13b, and 13c, a reactor 27, and a temperature sensor 30. Features of each of these devices are the same as in FIG. 7. Each of the inverter units is connected with voltage terminals $V_{B+}$ and $V_{B-}$ of the battery and with three-phase input terminals u, v, and w of the induction motor 3, and receives the motor torque command and the motor speed $\omega_M$ as an input. Each outputs the inverter failure signal and the inverter temperature. With this arrangement, the devices needed for torque control are all built into the inverter unit. It is thus possible to have an additional inverter unit simply by extending the torque distribution process section 15. The electric vehicle thus can be easily made to have high power simply by adding additional inverter units. The operation of such embodiment is essentially the same as that shown in FIG. 8, which can be extended for three inverters in a straight forward manner.

Figure 16:
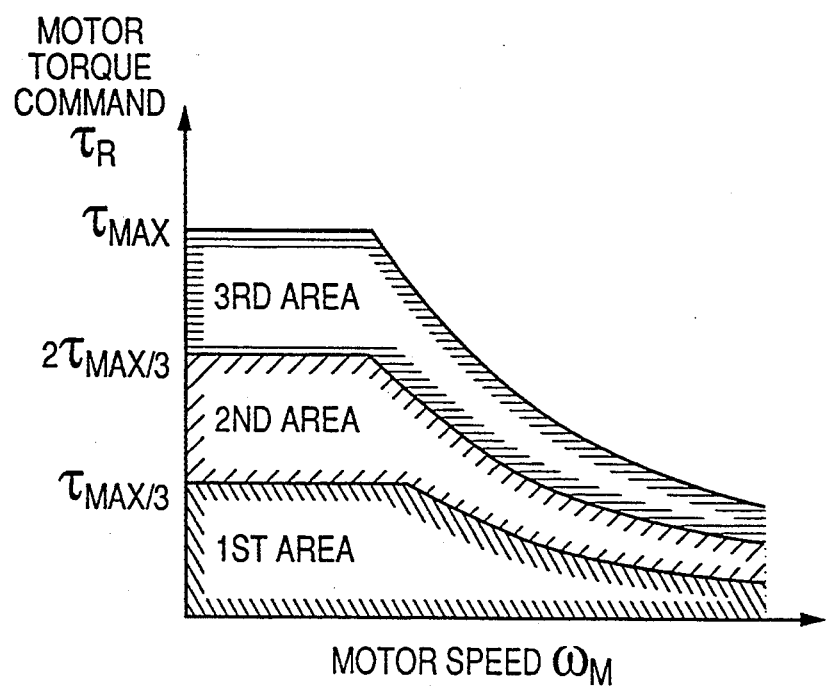
FIG. 16 is a characteristic graph of three divided areas of the motor torque command with respect to the motor speed in FIG. 13.
Figure 15:
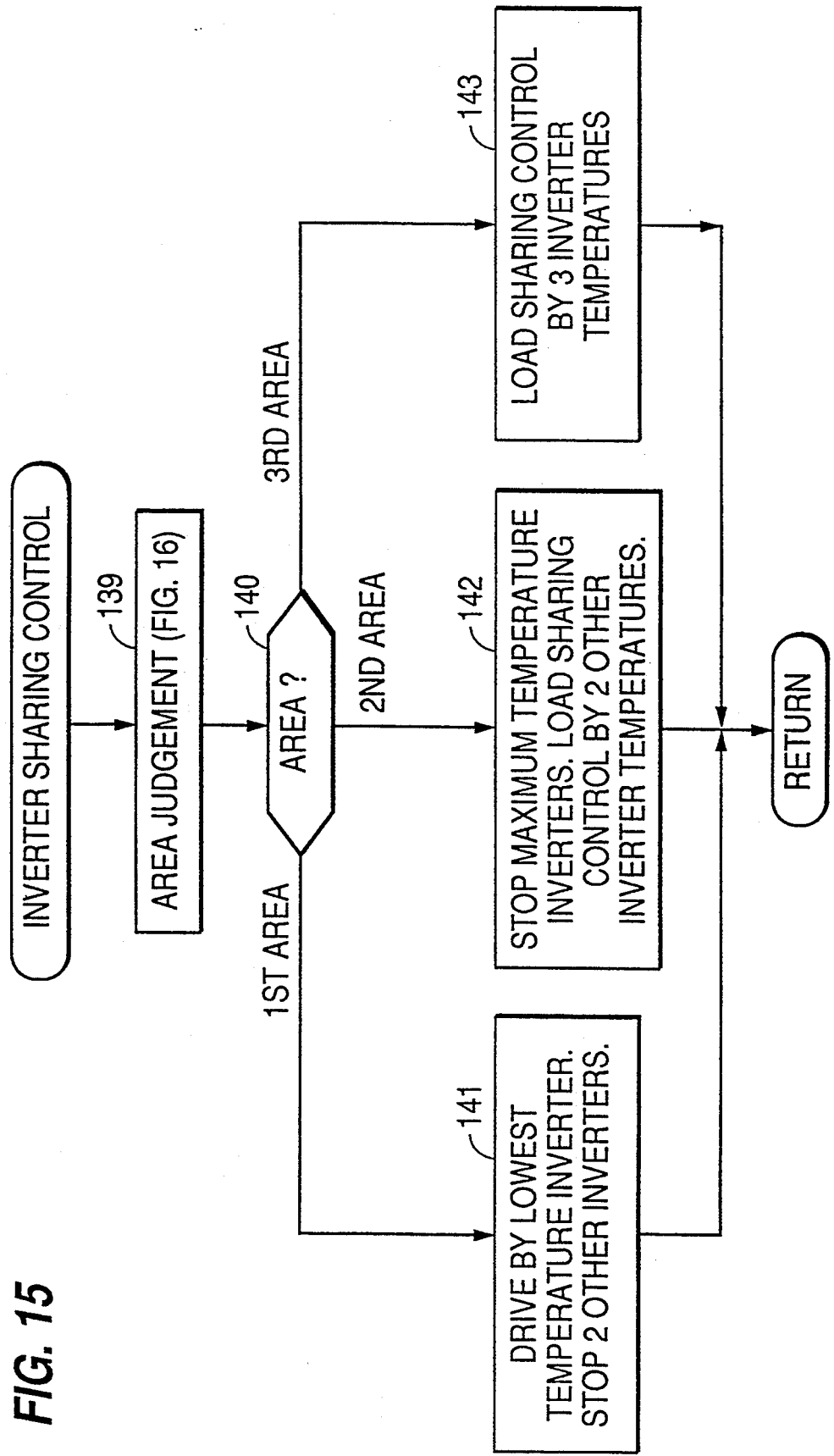
FIG. 15 is a flow chart for the inverter sharing control in FIG. 13.

FIG. 15 is a flow chart which shows an inverter sharing control. In step 139 a determination is made as to the operating area (based on the torque command $\tau_R$ and motor speed $\omega_M$) of the three phase induction motor 3, according to the areas defined in FIG. 16. FIG. 16 is a graphic depiction of the characteristics of the motor torque command $\tau_R$ versus motor speed $\omega_M$, which shows that at higher motor speeds, the area in which multiple inverters may be used is increased, as compared with FIG. 10. In other words, a high power is needed for the high speed even at a low torque. Use of the multiple of inverters provides the advantage that heating of the inverter can be reduced.

Referring again to FIG. 15, in Step 140 processing is routed to step 141, 142 or 143 depending on the area. For the first area having a relatively light load, control goes to step 141; for the second area having a higher load, control goes to step 142; and for the third having the heaviest load, control goes to step 143. Step 141 compares the detected inverter temperatures $R_1$, $T_2$, and $T_3$ and selects the inverter having the lowest temperature, stopping the other two inverters in order to make the inverter temperatures uniform. Step 142, on the other hand, stops the inverter of the highest temperature and controls the torque commands so that the load shares of the other inverters can be adjusted depending on their temperature difference. In step 143 the loads allocated to the respective inverters are adjusted by reducing that of the inverter with the highest temperature and increasing that of the inverter with the lowest temperature, so as to bring the temperatures of the three inverters into parity, before controlling the respective torque commands $\tau_{1R1}$, $\tau_{R2}$, and $\tau_{R3}$. These controls can thus drive the inverters at the lowest possible temperatures, which serves to increase their reliability and tolerance to temperature changes. At a lower temperature, the turn-on voltages of the power devices used in the inverters are also lower, which increases the efficiency. Even if the inverters have different efficiency for the same load, the inverter of higher efficiency can be used at a high rate, since the inverter of lower temperature has a higher efficiency.

Figure 17:
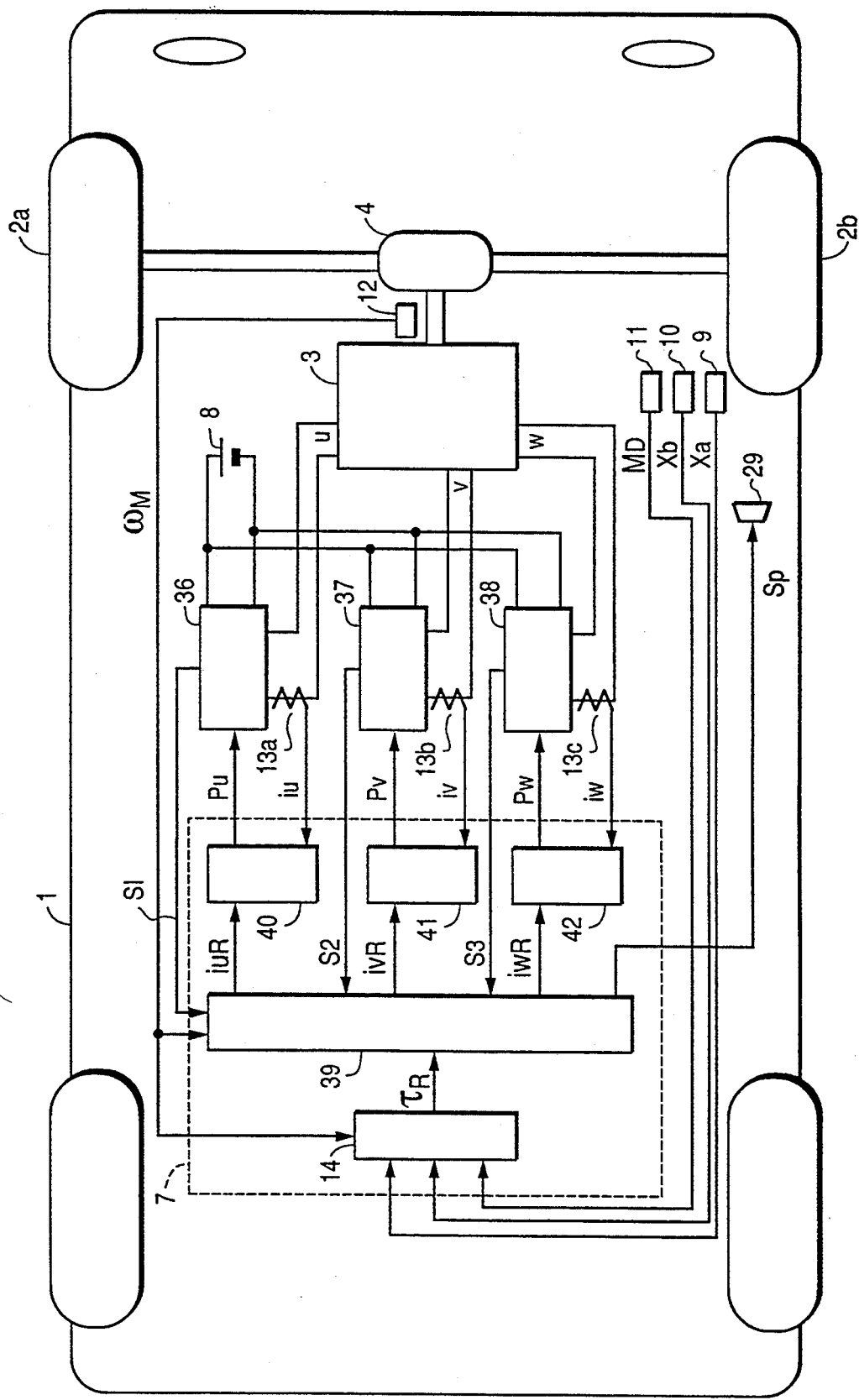
FIG. 17 is a schematic diagram for still another embodiment of the present invention in which an induction motor with three electrically independent phase windings drives the electric vehicle.
Figure 18:
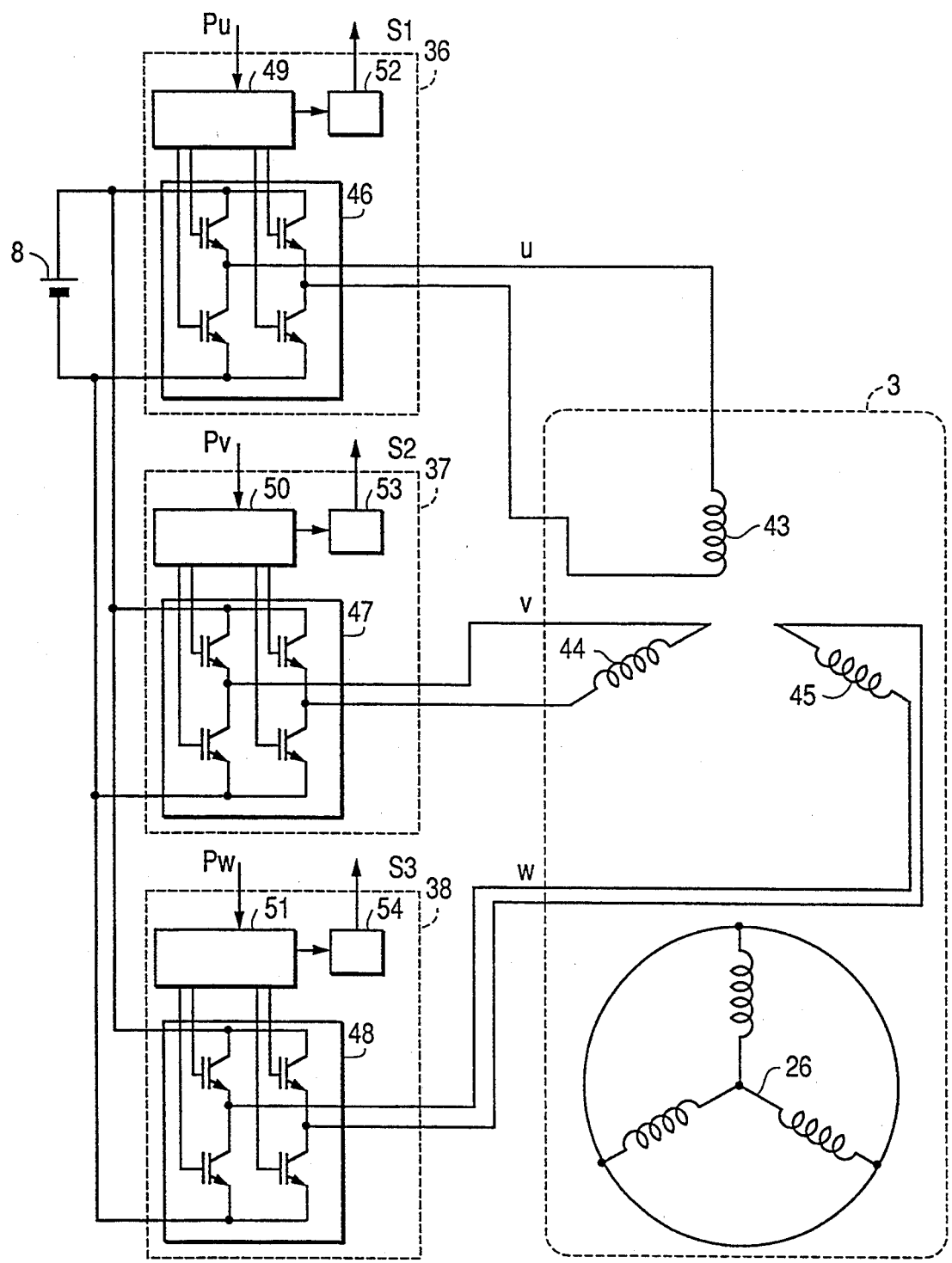
FIG. 18 is a circuit diagram which illustrates the connection of the induction motor with the three single-phase inverters in FIG. 17.

FIG. 17 is still another embodiment of the present invention, which differs from the ones in FIGS. 1 and 4 in the winding structure of the induction motor 3. That is, the induction motor 3 in this embodiment has electrically independent phase windings U, V, and W as shown in FIG. 18. Each of the windings is excited by one of the three single-phase inverters 36, 37, and 38, respectively. The inverters are controlled by a control unit 7 which is different from that of the embodiments described previously. The control unit 7 in FIG. 17 is made up of a torque command generation section 14, a torque control section 39, a phase U current control section 40, a phase V current control section 41, and a phase W current control section 42. The torque command generation section 14 is same as the one in the embodiment in FIG. 1.

The system in FIG. 17 controls the three single-phase inverters 36, 37, and 38 in such a manner as to generate a rotating field which can control the torque. For this purpose, the torque control section 39 performs a vector control operation for the motor torque command $\tau_R$ to obtain current commands $i_{UR}$, $i_{VR}$, and $i_{WR}$ for three phases of the induction motor 3, in the manner described in U.S. Pat. Nos. 4,455,522 and 4,862,343. On the basis of the current commands, and the fed back phase currents $i_U$, $i_V$ and $i_W$ from inverters 36, 37 and 38, the phase U current control section 40, the phase V current control section 41, and the phase W current control section 42 provide output PWM pulses $P_U$, $P_V$, and $P_W$ to control the three single-phase inverters 36, 37, and 38.

FIG. 18 shows the connection of the induction motor 3 with the three single-phase inverters 36, 37, and 38. The primary windings of the induction motor 3 are independent phase windings 43, 44, and 45, each of which has two terminals. Each of the three single-phase inverters 36, 37, and 38 is formed of single-phase main bridge circuits 46, 47, and 48, pulse distribution circuits 49, 50, 51, and failure detection circuits 52, 53, and 54, respectively. The single-phase main bridge circuits 46, 47, and 48 are connected with the phase windings 43, 44, and 45, respectively, so that currents can be output to drive the induction motor 3 as commanded by the torque control operation section 39. If any one of the power devices of the single-phase main circuit 46 fails, the associated failure detection circuit 52, 53, or 54 detects the failure and outputs an inverter failure signal $S_1$, $S_2$ or $S_3$ to the torque control operation section 39. With the inverter failure signal $S_1$, for example, the torque control operation section 39 stops the single-phase main circuit 46 and causes the other single-phase main circuits 47 and 48 to drive the induction motor 3 by themselves. Although it cannot reach the rated torque, the induction motor 3 can generate the rotating field necessary to move the electric vehicle 1.

This embodiment can move the electric vehicle in the event of an inverter failure with use of the three current sensors. The embodiment thus has the advantage that the system can be arranged to provide high reliability at a further reduction in cost.

Figure 19:
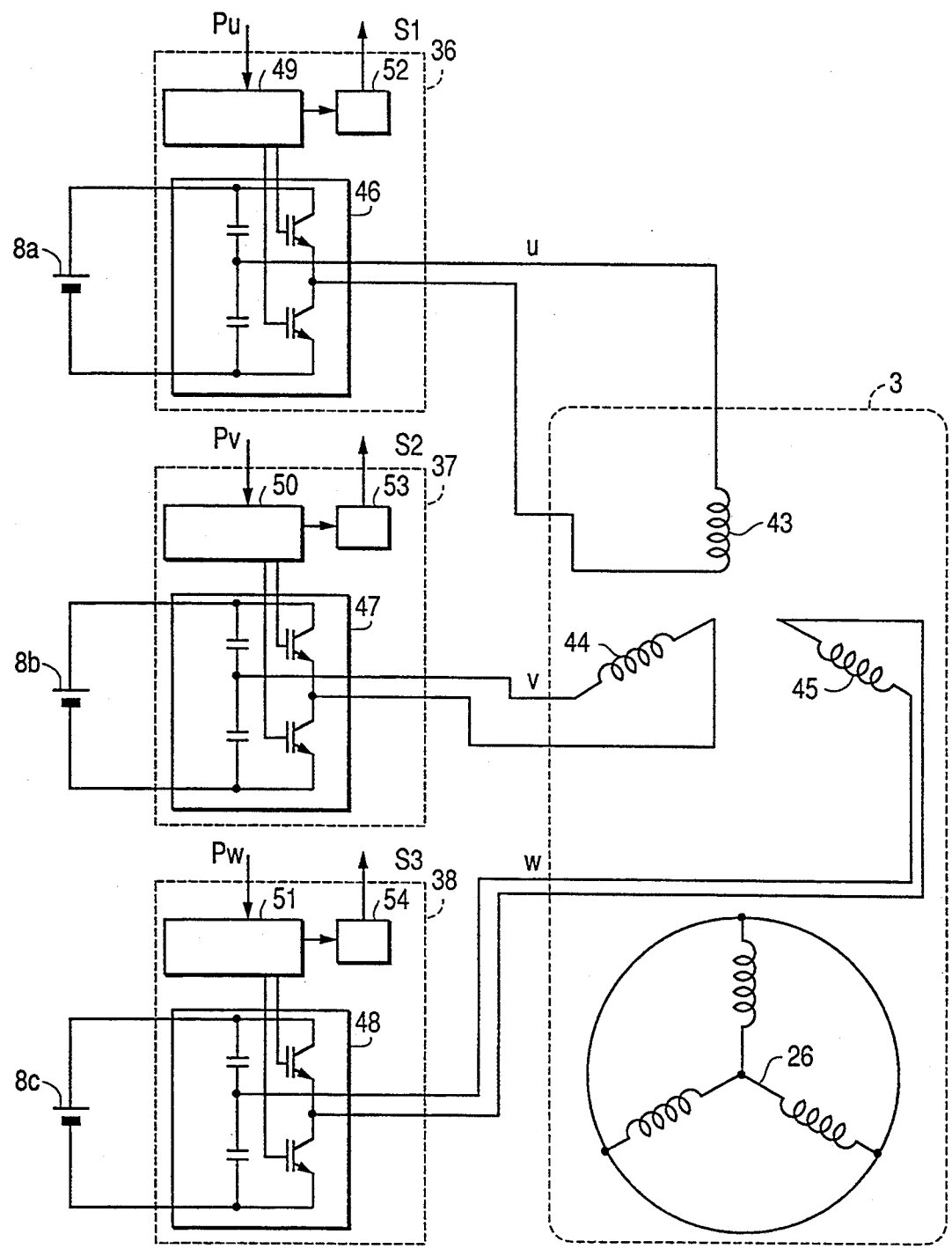
FIG. 19 is a circuit diagram of still another embodiment of the present invention, having different battery connections with a single-phase main circuit.

FIG. 19 shows still another embodiment of the present invention having a different battery connection arrangement and different single-phase main circuits than the embodiment in FIG. 18. In FIG. 19 three batteries 8a, 8b, and 8c are connected with the respective single-phase main circuits 46, 47, and 48. Each of the single-phase main circuits 46, 47, and 48 is a bridge circuit formed of two power devices and two capacitors. This system has the advantage that it uses half the number of power devices as compared with the one in FIG. 18, while still permitting the electric vehicle 1 to be moved despite a failure of one inverter. In addition, the vehicle 1 can be moved even if voltage of one battery is decreased.

Figure 20:
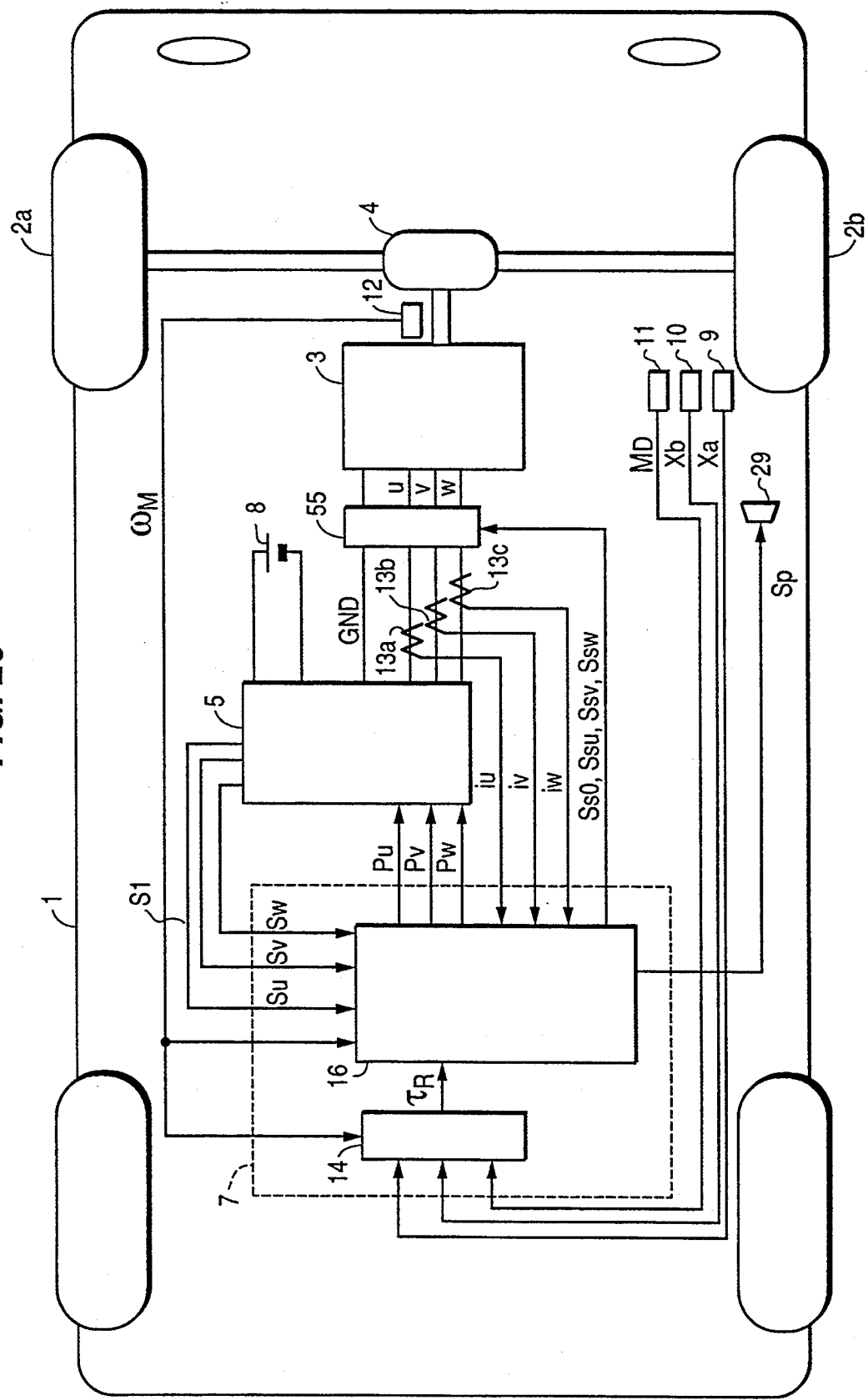
FIG. 20 is a schematic diagram for still another embodiment of the present invention in which a neutral point of the primary winding of the induction motor is connected with a voltage center of the battery.

FIG. 20 is still another embodiment of the present invention in which a neutral point of the primary winding of the induction motor 3 is used. This system differs from the one in FIG. 4 in that a single-inverter 5 drives the induction motor 3, and a switching circuit 55 is inserted between the inverter 5 and the induction motor 3. The switching circuit 55 is controlled by switch-on signals $S_{SO}$, $S_{SU}$, $S_{SV}$, and $S_{SW}$ from the torque control section 16. Since driving is controlled by the single inverter, the control unit 7 has no torque distribution process section 15. The torque control section 16 receives phase failure signals $S_U$, $S_V$, and $S_W$ for phases U, V, and W of the inverter input, from the inverter 5.

Figure 21:
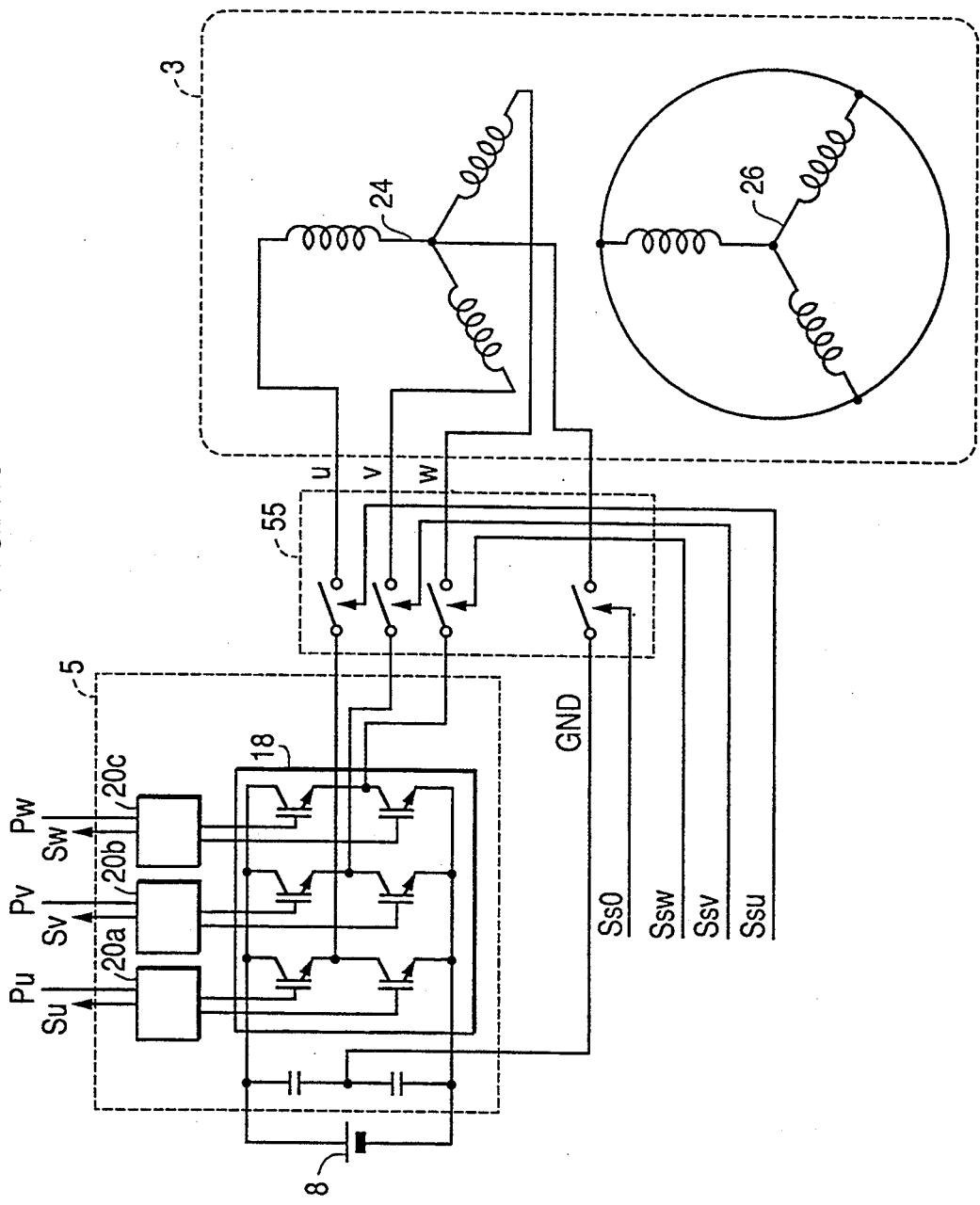
FIG. 21 is a circuit diagram illustrating connections of the switching circuit in FIG. 20.

FIG. 21 shows the connection of the inverter 5, the switching circuit 55, and the induction motor 3. The neutral point of the primary winding of the induction motor 3 can be connected via a switch with a connection of two serial capacitors connected across the battery, in response to the switch on-off signal $S_{SO}$. In ordinary operation, the signals $S_U$, $S_V$, and $S_W$ are turned on and the signal $S_{SO}$ is turned off, so that control is effected in the same manner as without the neutral point of the primary winding of the induction motor 3. (The signal $S_{SO}$ is normally turned off, as a zero-phase current can flow from the neutral point of the primary winding of the induction motor 3 with it turned on.)

If the power device corresponding to the phase U fails, the torque control section 16 receives phase failure signal $S_U$ to turn off the switch on-off signal $S_{SU}$ and turn on $S_{SO}$, $S_{SV}$, and $S_{SW}$. This allows the current to continue to flow for generating the rotating field to revolve the induction motor 3, although the zero-phase current flows. Alternatively, the neutral point of the primary winding of the induction motor 3 may be continuously connected to the center of the battery, and the zero-phase current can be controlled to 0 in the ordinary operation to improve the efficiency.

This embodiment provides a simple control arrangement, without a plurality of inverters, which allows the electric vehicle to run at a low speed, with increased reliability.

The embodiments of the present invention described thus far contain an induction motor 3 to drive the electric vehicle 1. The same principals can be applied, however, to embodiments driven by synchronous ac motors and dc motors. The limited maximum speed and the maximum torque can be made variable upon failure or depending on temperature. Moreover, although all of the embodiments described heretofore have a single motor, the invention can also be applied to an electric vehicle control system having one or more arrangements in which a plurality of inverters drive a single motor in an electric vehicle having a plurality of drive motors.

As described so far, in the electric vehicle having the motor driven by the power converting means, the electric vehicle control system of the present invention having an addition feature capable of moving the electric vehicle even upon failure of the power converting means, can accomplish a simple, highly reliable electric vehicle system.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Control system for controlling an electric vehicle powered by an electric motor, said control system comprising:
    at least two power converters coupled to supply electric power to said electric motor;
    a control unit for controlling each of said at least two power converters to cooperate to supply an electric current to said electric motor, having a magnitude which achieves a desired torque output of said motor according to a torque command value; and
    means for detecting a failure of any of said at least two power converters and for providing converter failure signals indicative thereof;
    said control unit including means for disabling any of said at least two power converters in response to said converter failure signals indicative of failure thereof, and for adjusting power output of at least one remaining power converter other than a disabled power converter in response to said converter signals.

2. Control system according to claim 1, wherein said control unit comprises:
    at least one input for receiving desired operating parameters from an operator of said vehicle;
    a torque command generation unit for generating a desired torque output signal in response to said desired operating parameters;
    and a torque distribution unit which adjusts power output of said at least one remaining power converter other than a disabled power converter, to a level which maintains total power provided to said electric motor at a level corresponding to said desired torque output signal.

3. Control system according to claim 2, wherein in the lo absence of a converter failure signal, said torque distribution unit causes each of said converters to operate at the same power output level, whereby total power provided to said motor causes it to produce said desired torque output.

4. Control system according to claim 2, wherein said at least one input comprises a brake pedal sensor for sensing a position of a brake pedal of said electric vehicle and an accelerator pedal sensor for sensing a position of an accelerator pedal of said electric vehicle.

5. Control system according to claim 1, wherein said electric motor is a polyphase induction motor, and wherein said power converters are polyphase DC-AC inverters coupled to provide polyphase electric current to said polyphase induction motor.

6. Control system according to claim 5, wherein said polyphase induction motor has at least two primary polyphase windings, each of such primary windings being coupled to receive a polyphase electric current from a different one of said at least two power converters, 7. Control system according to claim 5, wherein said polyphase induction motor has a single primary winding, and each of said at least two power converters is coupled to provide a polyphase electric current to said primary winding.

8. Control system according to claim 7, wherein said at least two power converters are each coupled to said primary winding of said induction motor by means of a reactance element.

9. Method of controlling an electric vehicle powered by an electric motor, said method comprising the steps of:

providing at least two power converter units coupled to supply electric power to said motor;

controlling each of said at least two power converters to cooperate to supply an electric current to said motor, having a magnitude which achieves a desired torque output of said motor according to a torque command value;

detecting a failure of any of said power converters and providing converter failure signals indicative thereof; and disabling any of said at least two power converters in response to said converter failure signal.

10. Method according to claim 9, wherein said controlling step comprises:

determining a desired torque output from said motor and generating a torque command value indicative thereof; and controlling power output of each of said at least two power converters to achieve said desired torque output.

11. Control system according to claim 1, wherein said control unit further comprises:

torque command means for generating a motor torque command indicative of a desired level of output torque from said motor; and means, responsive to said torque command means, for controlling power output of each of said at least two power converters so that total power provided to said motor generates said desired output torque level.

12. Control system according to claim 1, wherein said control unit further comprises:

means for comparing said desired torque output of said motor with a predetermined maximum torque output; and means for comparing speed of said motor with a predetermined maximum speed value.

13. Control system according to claim 12, wherein said control unit further comprises:

means for setting an output torque limiting value when motor speed exceeds said maximum speed value.

14. Control system according to claim 13, wherein said torque limiting value is zero.

15. Control system according to claim 13, wherein said torque limiting value is negative.

16. Control system according to claim 12, wherein said control unit further comprises:

means for setting a torque limit value equal to said maximum torque output when said desired torque is greater than said maximum torque output.

17. Control system according to claim 1, wherein said control unit further comprises:

means for enabling an alarm signal in response to power converter failure signals indicative of failure of all of said power converters.

18. Control system according to claim 12, wherein said control unit comprises means for setting both of said maximum torque output and said maximum speed value equal to zero in response to converter failure signals indicative of failure of all of said power converters.

19. Control system according to claim 12, wherein said control unit comprises means for displaying maximum motor output information to an operator of said motor in response to converter failure signals indicative of failure of at least one of said power converters.

20. Control system according to claim 1, further comprising:

at least two temperature detectors, each of said power converters having a different one of said temperature detectors coupled to detect temperature thereof; and wherein said control unit comprises means for operating only one of said inverters having lowest detected temperature among all of said power converters when said desired torque output is less than a predetermined threshold level.

21. Control system according to claim 20, wherein number of said power converters is two, and wherein said means for operating disables one of said power converters having a higher detected temperature when said desired torque output is less than half of a maximum torque output for said motor.

22. Control system according to claim 1, further comprising:

an output torque detector for detecting output torque of said motor; and means for disabling said at least two power inverters when detected output torque of said motor exceeds a predetermined maximum value.

23. Control system according to claim 1, comprising:

at least three power converters; and at least three temperature detectors, each of said power converters having a different one of said temperature detectors coupled to detect temperature thereof;

wherein said control unit comprises means for operating only one of said power converters having lowest detected temperature when said desired torque output is less than a first threshold limit, for operating two of said power converters having lowest detected temperatures when said desired torque output is greater than said first threshold limit and less than a second threshold limit, and for operating all three of said power converters when said desired torque is greater than said second threshold limit.

24. Control system according to claim 23, wherein said first and second threshold limits are variable, and decrease with increasing motor speed.

25. Control system for controlling an electric vehicle powered by an electric motor having a primary winding which comprises at least three electrically independent phase windings, said control system comprising:

at least three single-phase DC-AC inverters, each of said inverters being coupled to supply a field current to a different one of said phase windings;

a control unit for controlling each of said at least three inverters to cooperate to supply electric power to said electric motor, having a magnitude which achieves a desired torque output of said motor according to a torque command value; and means for detecting a failure of any of said at least three inverters and for providing inverter failure signals indicative thereof;

said control unit including means for disabling any of said at least three power inverters in response to said inverter failure signals indicative of failure thereof, and for adjusting power output of remaining inverters other than a disabled inverter in response to said converter signals.

26. Control system according to claim 23, wherein said motor is a three phase induction motor having three electrically independent phase windings.

27. Control system according to claim 23, wherein said control unit comprises:
- a torque command generation unit which determines a desired torque output of said motor and generates a motor torque command signal indicative thereof; and
- torque control means coupled to receive said torque command signal and to generate current commands for each of said phase windings of said motor; and
- at least three phase current control units coupled to receive said current commands and to output signals to control respective ones of said single phase inverters.

28. Control system according to claim 26, wherein said single phase DC-AC inverters are all coupled to receive electric power from a single DC power supply.

29. Control system according to claim 26, wherein each of said DC-AC inverters comprises a single phase main bridge circuit having four electric power switching devices.

30. Control system according to claim 26, wherein each of said single phase DC-AC inverters has a separate DC power supply coupled to supply electric power thereto.

31. Control system according to claim 26, wherein each of said DC-AC inverters comprises a single phase main bridge circuit having two electric power switching devices, and two capacitors coupled in parallel thereto.

32. Apparatus for controlling operation of an electric motor having a primary winding which comprises at least three phase windings, each of said phase windings being connected to a common neutral point, said apparatus comprising:
- a power converter coupled to supply multiphase electric current to said electric motor, one such phase being coupled to each phase winding of said electric motor;
- means for detecting a failure of the current supply to any of said electric phase windings of said motor and for providing a phase failure signal indicative thereof;
- a control unit for controlling said power converter to provide electric power to said electric motor, having a magnitude which achieves a desired torque output of said motor according to a torque command value, said control unit including means for generating a disabling signal for any of said phase windings in response to a phase failure signal indicative of a failure thereof; and
- a switching unit comprising a plurality of switch elements coupling said phases of said multiphase electric current from said power converter to said phase windings of said electric motor, each of said switch elements being responsive to said disabling signal to disable one of said phase windings in response to failure thereof.

33. Apparatus according to claim 32, wherein said switching unit further comprises:
- a switch element operative to couple said neutral point to ground when any of said phase windings is disabled.

34. Apparatus according to claim 32, wherein:
said neutral point is continuously connected to ground; and
said control unit includes means for adjusting said neutral phase current to zero when any of said phase windings is disabled.

* * * * *

UNITED STATES PATENT AND TRADEMARK OFFICE
CERTIFICATE OF CORRECTION

PATENT NO. : 5,414,339
DATED : May 9, 1995
INVENTOR(S) : Ryoso Masaki, et al.

It is certified that error appears in the above-identified patent and that said Letters Patent is hereby corrected as shown below:

On the title page in section [73] the following should be inserted after the assignee already listed:

-- Hitachi Ltd., Japan --

Signed and Sealed this

Third Day of July, 2001

*Attest:*

NICHOLAS P. GODICI
*Attesting Officer*   *Acting Director of the United States Patent and Trademark Office*